United States Patent
Bozler et al.

(10) Patent No.: US 7,484,857 B2
(45) Date of Patent: Feb. 3, 2009

(54) LIGHT MODULATING MIRROR DEVICE AND ARRAY

(75) Inventors: Carl O. Bozler, Waltham, MA (US); W. Gregory Lyons, Concord, MA (US); Jeremy B. Muldavin, Westford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 159 days.

(21) Appl. No.: 11/000,427

(22) Filed: Nov. 30, 2004

(65) Prior Publication Data

US 2006/0114545 A1 Jun. 1, 2006

(51) Int. Cl.
*G02B 5/122* (2006.01)
*G02F 1/03* (2006.01)
*G01J 5/02* (2006.01)

(52) U.S. Cl. ........................ 359/529; 359/530; 359/230; 359/254; 356/152.3; 250/342

(58) Field of Classification Search ................. 359/529, 359/530, 223–297, 152.2, 152.3, 846–849, 359/872, 315–320; 250/342; 356/152.2, 356/152.3

See application file for complete search history.

(56) References Cited

U.S. PATENT DOCUMENTS

| | | | |
|---|---|---|---|
| 3,911,433 A | 10/1975 | Redman | 342/53 |
| 3,989,942 A | 11/1976 | Waddoups | 398/170 |
| 4,131,791 A | 12/1978 | Lego, Jr. | 398/171 |
| 4,134,008 A | 1/1979 | De Corlieu et al. | 398/170 |
| 4,441,791 A | 4/1984 | Hornbeck | 359/295 |
| 4,710,732 A | 12/1987 | Hornbeck | 359/291 |
| 4,731,879 A | 3/1988 | Sepp et al. | 398/170 |
| 4,763,361 A | 8/1988 | Honeycutt et al. | 398/168 |
| 4,983,021 A | 1/1991 | Fergason | 349/1 |
| 5,061,049 A | 10/1991 | Hornbeck | 359/229 |
| 5,233,459 A | 8/1993 | Bozler et al. | 359/230 |
| 5,355,241 A | 10/1994 | Kelley | 398/170 |
| 5,375,008 A | 12/1994 | Guerreri | 398/170 |
| 5,459,470 A | 10/1995 | Wootton et al. | 342/45 |
| 5,784,189 A * | 7/1998 | Bozler et al. | 359/254 |
| 6,154,299 A | 11/2000 | Gilbreath et al. | 398/170 |
| 6,233,088 B1 | 5/2001 | Roberson et al. | 359/291 |
| 6,236,491 B1 | 5/2001 | Goodwin-Johansson | 359/291 |
| 6,493,123 B1 | 12/2002 | Mansell et al. | 398/169 |
| 6,669,145 B1 | 12/2003 | Green | 244/135 A |
| 7,053,737 B2 * | 5/2006 | Schwartz et al. | 335/78 |
| 2002/0135857 A1 | 9/2002 | Fitzpatrick et al. | 359/291 |
| 2003/0146464 A1* | 8/2003 | Prophet | 257/306 |
| 2004/0001033 A1 | 1/2004 | Goodwin-Johansson et al. | 345/3.31 |
| 2005/0088767 A1* | 4/2005 | Reboa | 359/872 |
| 2005/0219016 A1* | 10/2005 | Chou et al. | 335/78 |
| 2006/0249801 A1* | 11/2006 | Matsuo | 257/415 |

FOREIGN PATENT DOCUMENTS

EP 1138426 6/2003

\* cited by examiner

*Primary Examiner*—Huy K Mai
(74) *Attorney, Agent, or Firm*—Gauthier & Connors LLP

(57) ABSTRACT

A deformable reflector includes a plurality of MEMS devices, each having an electrode membrane having a reflective surface thereon, a flat surface, and a pulldown electrode formed in the flat substrate. The electrode membrane has substantially a same flatness of the flat substrate when the electrode membrane comes into contact with the flat substrate across a majority of its surface area in response to a voltage being applied to the pulldown electrode. The electrode membrane has a two-dimensional curvature when no voltage is applied to the pulldown electrode.

90 Claims, 27 Drawing Sheets

LIGHT MODULATING MIRROR DEVICE AND ARRAY

This invention was made with government support under Contract No. F19628-00-C-0002 awarded by the Air Force. The government has certain rights in the invention.

FIELD OF THE PRESENT INVENTION

The present invention is directed to light modulators using an array of deformable mirrors. More particularly, the present invention is an array of deformable mirrors wherein each deformable mirror is in a same plane so as to provide planar reflection of light when a voltage is applied to a pulldown electrode.

BACKGROUND OF THE PRESENT INVENTION

Light modulating mirror devices have been developed in which a mirror or reflector is can be positioned at various locations to either direct the impinging light to one location or to direct the impinging light to another location.

When a voltage is applied to one region housing the mirror, the mirror is moved so that the impinging light is directed to a first location. When the voltage is removed or applied to another region housing the mirror, the mirror is moved so that the impinging light is directed to a second location.

Such a device can be implemented in a variety of optical applications. For example, U.S. Pat. No. 5,061,049, issued on Oct. 29, 1991, entitled "Spatial Light Modulator and Method," describes an spatial light modulator with a movable mirror.

Spatial light modulators are transducers that modulate incident light in a spatial pattern corresponding to an electrical or optical input. The incident light may be modulated in its phase, intensity, polarization, or direction, and the light modulation may achieved by a variety of materials exhibiting various electrooptic or magnetoopotic effects and by materials that modulate light by surface deformation.

An example of a prior art single pixel of an electrostatic (rigid) movable mirror device is illustrated by FIG. 1. The pixel, generally denoted 20, is basically a plate (flap) covering a shallow well and includes silicon substrate 22, insulating spacer 24, metal hinge layer 26, metal plate layer 28, plate 30 formed in layers 26-28, and plasma etch access holes 32 in plate 30. The portions 34 & 36 of hinge layer 26 that are not covered by plate layer 28 form torsion hinges (torsion rods) attaching beam 30 to the portion of layers 26-28 supported by spacer 24. Electrodes 40, 42, 46, and 41 run between spacer 24 and substrate 22 and are isolated from substrate 22 by silicon dioxide layer 44.

The design of FIG. 1 allows that the plate metal be as thick as desired and the hinge metal be as thin as desired without the problems of step coverage of the hinge metal over the plate metal and that the spacer surface under the beam metal is not exposed to processing side effects which would arise if the hinge were formed as a rectangular piece on the spacer prior to deposition of the plate metal.

Pixel 20 is operated by applying a voltage between metal layers 26-28 and electrodes 42 or 46 on substrate 22: beam 30 and the electrodes form the two plates of an air gap capacitor and the opposite charges induced on the two plates by the applied voltage exert electrostatic force attracting beam 30 to substrate 22, whereas electrodes 40 and 41 are held at the same voltage as beam 30. This attractive force causes beam 30 to twist at hinges 34 and 36 and be deflected towards substrate 22.

FIG. 1 also indicates the reflection of light from deflected beam 30 as may occur during operation of a deformable mirror device. The deflection of beam 30 can be a highly non-linear function of the applied voltage because the restoring force generated by the twisting of hinge 34 is approximately a linear function of the deflection but the electrostatic force of attraction increases as a function of the reciprocal of the distance between the closest corner of beam 30 and substrate 22.

Although electrostatic movable mirror devices have been used, the conventional electrostatic movable mirror devices fail to realize many desired characteristics. For example, the conventional electrostatic movable mirror devices have a relatively slow speed of actuation and use a relatively large amount of energy for actuation. Moreover, the conventional electrostatic movable mirror devices have a relatively high voltage of actuation, are complicated to build, and are not necessarily scalable to very small sizes. Lastly, the conventional electrostatic movable mirror devices have a relatively small extinction ratio.

Therefore, it is desirable to provide a mirror device that has a relatively higher speed of actuation, lower energy of actuation, lower voltage of actuation, simpler to build, easier to scale to very small sizes, and/or larger extinction ratio. Moreover, it is desirable to provide a deformable mirror device that has a relatively higher speed of actuation, lower energy of actuation, lower voltage of actuation, simpler to build, easier to scale to very small sizes, and/or larger extinction ratio.

SUMMARY OF THE PRESENT INVENTION

One aspect of the present invention is a retroreflector. The retroreflector includes a first non-deformable mirror to provide reflection of light back to a source thereof and a deformable mirror having a first state to provide reflection of light back to the source thereof and a second state to provide misdirection of light to prevent the reflection of light back to the source thereof.

Another aspect of the present invention is a passive interrogatable sensor. The passive interrogatable sensor includes a sensing device to sense predetermined conditions of a surrounding environment and generate signals representative of the sensed predetermined conditions; a controller to process the generated signals and to produce drive signals in response thereof; a first non-deformable mirror to provide reflection of light back to a source thereof; arid a deformable mirror, operatively connected to the controller, being driven to either a first state or a second state in response to drive signals from said controller. The first state provides reflection of light back to the source thereof. The second state provides misdirection of light to prevent the reflection of light back to the source thereof.

A further aspect of the present invention is an optical identification system. The optical identification system includes a laser source, disposed remotely from an object to be interrogated, for transmitting an unmodulated beam toward the object to be interrogated; a controller, disposed with the object to be interrogated, to produce drive signals associated with identification information; a first non-deformable mirror, disposed with the object to be interrogated, to provide reflection of light back to the laser source; a deformable mirror, disposed with the object to be interrogated and operatively connected to the controller, being driven to either a first state or a second state in response to drive signals from said controller. The first state provides reflection of light back to the laser source. The second state provides misdirection of light to prevent the reflection of light back to the laser source.

The deformable mirror modulates the light to be reflected back to the laser source so as to encode identification information as reflected modulated light. A detector, disposed with the laser source, decodes identification information from light received from the deformable mirror disposed with the object to be interrogated.

Another aspect of the present invention is a deformable mirror. The deformable mirror includes a plurality of MEMS devices. Each MEMS device includes an electrode membrane having a reflective surface thereon, a flat substrate, and a pulldown electrode formed in the flat substrate. The electrode membrane has substantially a same flatness of the flat substrate when the electrode membrane comes into contact with the flat substrate across a majority of its surface area in response to a voltage being applied to the pulldown electrode. The electrode membrane has a two-dimensional curvature when no voltage is applied to the pulldown electrode.

Another aspect of the present invention is a deformable mirror. The deformable mirror includes a substrate; a plurality of MEMS devices formed in the substrate, each MEMS device including an electrode membrane having a reflective surface thereon; and a pulldown electrode formed in the substrate. The electrode membrane has substantially a same flatness of the substrate when the electrode membrane comes into contact with the substrate across a majority of its surface area in response to a voltage being applied to the pulldown electrode. The electrode membrane has a two-dimensional curvature when no voltage is applied to the pulldown electrode.

A further aspect of the present invention is a deformable mirror. The deformable mirror includes a plurality of MEMS devices. Each MEMS device includes a flat substrate, a flexible membrane attached, at one end, to a surface of the flat substrate and having a reflective surface thereon, and a pulldown electrode formed in the flat substrate. The flexible membranes, each, have a plurality of dimples formed thereon. The flexible membranes, each, are configured such that when a voltage is applied to the pulldown electrode, the flexible membrane is disposed to provide a desired reflection of light. The flexible membranes, each, contact the substrate at the dimples when a voltage is applied to the pulldown electrode. The flexible membranes, each, have a two-dimensional curvature when no voltage is applied to the pulldown electrode.

Another aspect of the present invention is a deformable mirror. The deformable mirror includes a substrate; a plurality of MEMS devices formed in the substrate, each MEMS device including a flexible membrane, at one end, to a surface of the substrate and having a reflective surface thereon; and a pulldown electrode formed in the substrate. The flexible membranes, each, have a plurality of dimples formed thereon. The flexible membranes, each, are configured such that when a voltage is applied to the pulldown electrode, the flexible membrane is disposed to provide a desired reflection of light. The flexible membranes, each, contact the substrate at the dimples when a voltage is applied to the pulldown electrode. The flexible membranes, each, have a two-dimensional curvature when no voltage is applied to the pulldown electrode.

Another aspect of the present invention is a deformable mirror. The deformable mirror includes a plurality of MEMS devices. Each MEMS device includes a flat substrate, a flexible membrane attached, at one end and an opposite end, to a surface of the flat substrate and having a reflective surface thereon, and a pulldown electrode formed in the flat substrate. The flexible membranes, each, have a plurality of dimples formed thereon. The flexible membranes, each, are configured such that when a voltage is applied to the pulldown electrode, the flexible membrane is disposed to provide a desired reflection of light. The flexible membranes, each, contact the substrate at the dimples when a voltage is applied to the pulldown electrode. The flexible membranes, each, have a two-dimensional curvature when no voltage is applied to the pulldown electrode.

Another aspect of the present invention is a deformable mirror. The deformable mirror includes a substrate; a plurality of MEMS devices formed in the substrate, each MEMS device including a flexible membrane, at one end and an opposite end, to a surface of the substrate and having a reflective surface thereon; and a pulldown electrode formed in the substrate. The flexible membranes, each, have a plurality of dimples formed thereon. The flexible membranes, each, are configured such that when a voltage is applied to the pulldown electrode, the flexible membrane is disposed to provide a desired reflection of light. The flexible membranes, each, contact the substrate at the dimples when a voltage is applied to the pulldown electrode. The flexible membranes, each, have a two-dimensional curvature when no voltage is applied to the pulldown electrode.

A further aspect of the present invention is a deformable mirror. The deformable mirror includes a plurality of MEMS devices. Each MEMS device includes a flat substrate, a flexible membrane attached, at one end, to a surface of the flat substrate and having a reflective surface thereon, and a pulldown electrode formed in the flat substrate. The flat substrate has a plurality of posts formed thereon. The flexible membranes, each, are configured such that when a voltage is applied to the pulldown electrode, the flexible membrane is disposed to provide a desired reflection of light. The flexible membranes, each, contact the posts when a voltage is applied to the pulldown electrode. The flexible membranes, each, have a two-dimensional curvature when no voltage is applied to the pulldown electrode.

Another aspect of the present invention is a deformable mirror. The deformable mirror includes a substrate; a plurality of MEMS devices formed in the substrate, each MEMS device including a flexible membrane, at one end, to a surface of the substrate and having a reflective surface thereon; and a pulldown electrode formed in the substrate. The substrate has a plurality of posts formed thereon. The flexible membranes, each, are configured such that when a voltage is applied to the pulldown electrode, the flexible membrane is disposed to provide a desired reflection of light. The flexible membranes, each, contact the posts when a voltage is applied to the pulldown electrode. The flexible membranes, each, have a two-dimensional curvature when no voltage is applied to the pulldown electrode.

Another aspect of the present invention is a deformable mirror. The deformable mirror includes a plurality of MEMS devices. Each MEMS device includes a flat substrate, a flexible membrane attached, at one end and an opposite end, to a surface of the flat substrate and having a reflective surface thereon, and a pulldown electrode formed in the flat substrate. The flat substrate has a plurality of posts formed thereon. The flexible membranes, each, are configured such that when a voltage is applied to the pulldown electrode, the flexible membrane is disposed to provide a desired reflection of light. The flexible membranes, each, contact the posts when a voltage is applied to the pulldown electrode. The flexible membranes, each, have a two-dimensional curvature when no voltage is applied to the pulldown electrode.

Another aspect of the present invention is a deformable mirror. The deformable mirror includes a substrate; a plurality of MEMS devices formed in the substrate, each MEMS device including a flexible membrane, at one end and an opposite end, to a surface of the substrate and having a reflective surface thereon; and a pulldown electrode formed in the substrate. The substrate has a plurality of posts formed thereon. The flexible membranes, each, are configured such that when a voltage is applied to the pulldown electrode, the flexible membrane is disposed to provide a desired reflection of light. The flexible membranes, each, contact the posts when a voltage is applied to the pulldown electrode. The flexible membranes, each, have a two-dimensional curvature when no voltage is applied to the pulldown electrode.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION OF THE PRESENT INVENTION

Figure 1:
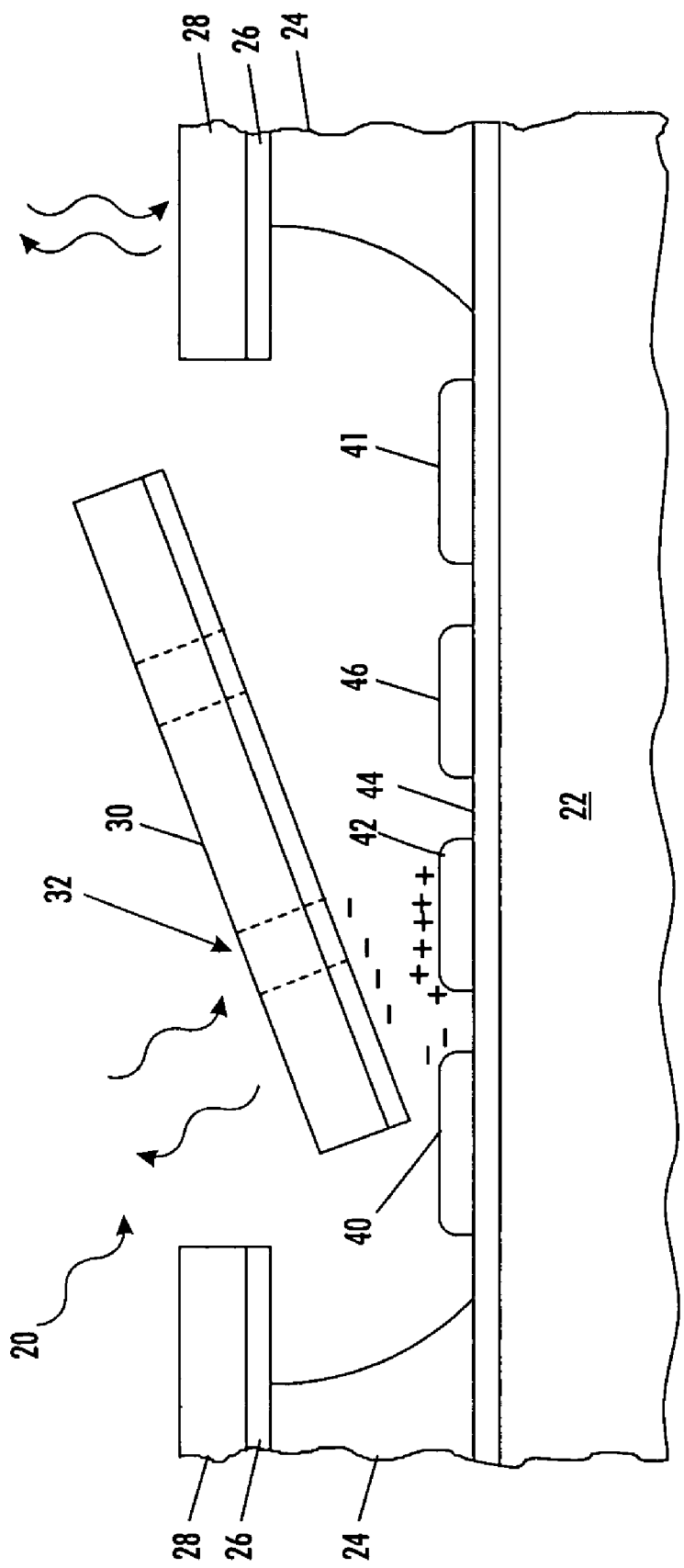
FIG. 1 illustrates a prior art deformable mirror device.

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention, as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions have been purposely drawn disproportionately so that the features and concepts of the present invention could be properly illustrated.

As noted above, the present invention relates to light modulators using deformable mirrors either individually or in arrays for applications such as special light modulators and modulated retroreflectors.

Modulated retroreflector devices can be divided into two types, modulated comer cube retroreflectors and Cats-Eye. The Cats-Eye type are a device which relies upon one or more lenses to focus the laser beam to a small spot, having a modulating reflector at this spot and sending the light back through the lens to the source. The position of the focal spot will depend on the direction of the incoming light beam, so that the Cats-Eye type requires a modulation area at least as large as the aperture of the lens in order to reflect back light coming from a wide variety of angles. In most cases the total mirror area for the Cats-Eye type is at least as large for the Cats-Eye type as for one of the modulated comer cube retroreflector mirrors.

Modulated retroreflector and reflective display devices can also be divided into several categories (liquid crystal light valve, electro-optic (multiple quantum well) light valve, electrostatic modulated mirror) depending on the modulation technique. The electrostatic mirror or reflector devices can again be divided into two categories, electrostatic (rigid) movable mirror or reflector and deformable mirror or reflector.

A modulated corner cube retro reflector includes an array of deformable mirrors or reflectors that fills the area of one of the three surfaces of a corner cube, the other two surfaces being non-deformable mirrors or reflectors. All the deformable mirrors or reflectors in the array can operate in unison, so that a laser beam entering the aperture of the modulated corner cube retroreflector will be reflected back on itself and returned to the source with little change in divergence when all the deformable mirrors or reflectors are flat.

When the deformable mirrors or reflectors are not so flat, a divergent beam is returned, so that when the deformable mirror or reflector array's flatness is modulated, the returned beam, when it is measured at the source, is modulated in its intensity. Such a modulated corner cube retroreflector can be used as a communication device consuming very low power at the modulated corner cube retroreflector site since is a "passive device" and is only reflecting the energy of the remote laser source.

In the case of a second application, the special light modulator, the deformable mirrors in the array are individually addressed and modulated such that each deformable mirror is a pixel and can be used to make a reflective display for television, computer monitors, and movie projectors. This type of display is a "passive display" because the light energy for the display comes from a separate light source.

Conventional deformable mirror or reflector devices have a mirror or reflector membrane electrode whose curvature is varied by applying an electrostatic voltage more or less perpendicular to the surface of the membrane. In some of these conventional cases, the membrane is stretched flat over an opening or across a gap. Moreover, in other conventional designs, the membrane is held all around the edges or held by two parallel edges. This later mode is sometime referred to as a fixed-fixed beam.

In the conventional device, through the application of an electrostatic field, the membrane is deformed or curved spoiling the flat mirror reflection, thereby causing the reflected light beam to converge or diverge. An example of such a conventional device is disclosed in U.S. Pat. No. 4,441,791.

As disclosed in U.S. Pat. No. 4,441,791, the flexing action stretches the membrane like a spring or a rubber band, increasing the stress. There is a limit to how far the membrane can be stretched in this case because it will eventually undergo plastic flow or a tensile failure. This type of conventional deformable mirror membrane can also be sensitive to temperature when the membrane has a temperature expansion coefficient different than the substrate, because the stress, and therefore the actuation voltage will vary with temperature.

Figure 2:
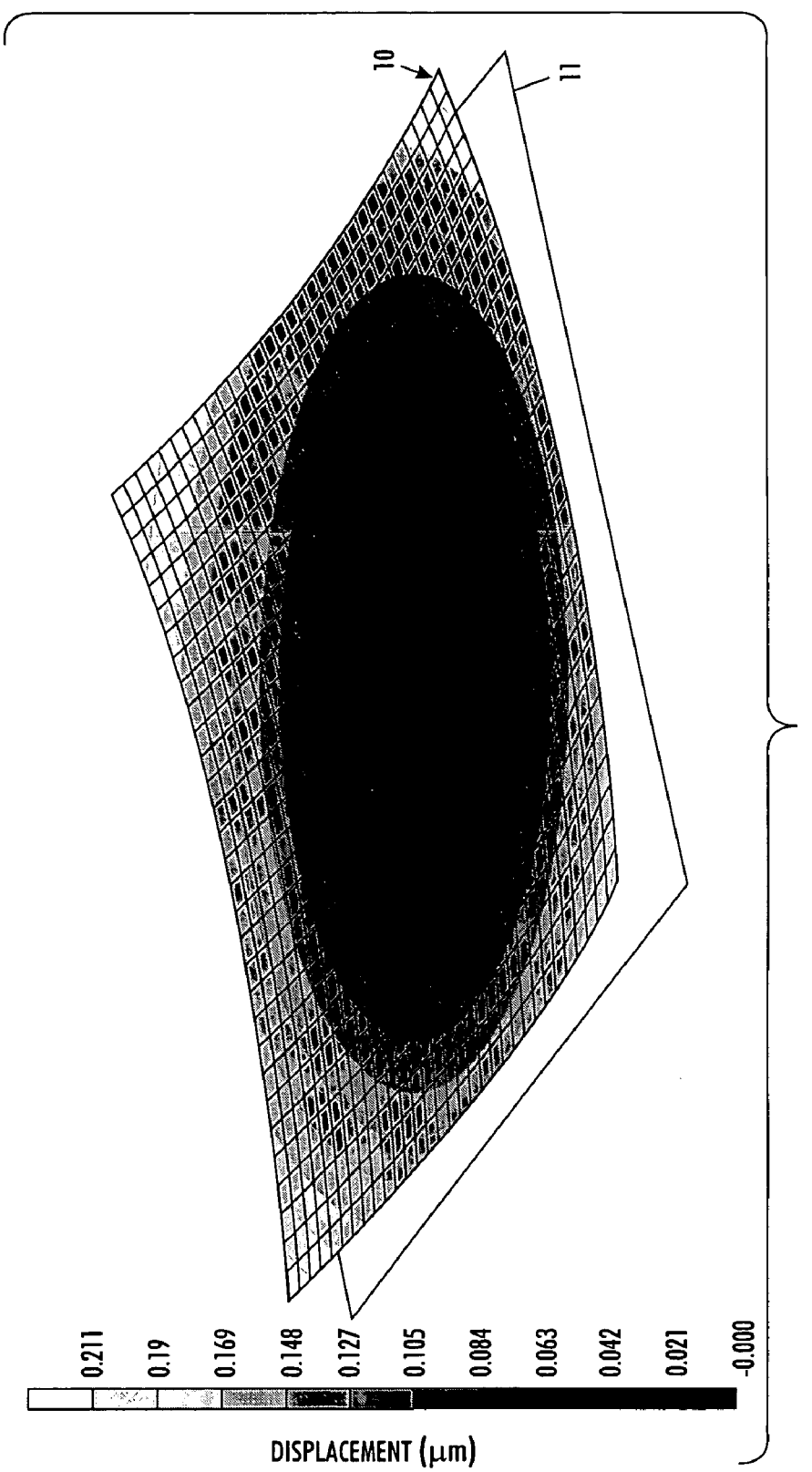
FIGS. 2 and 3 illustrate two possible examples of cantilever structures used in a deformable mirror device according to the concepts of the present invention.
Figure 3:
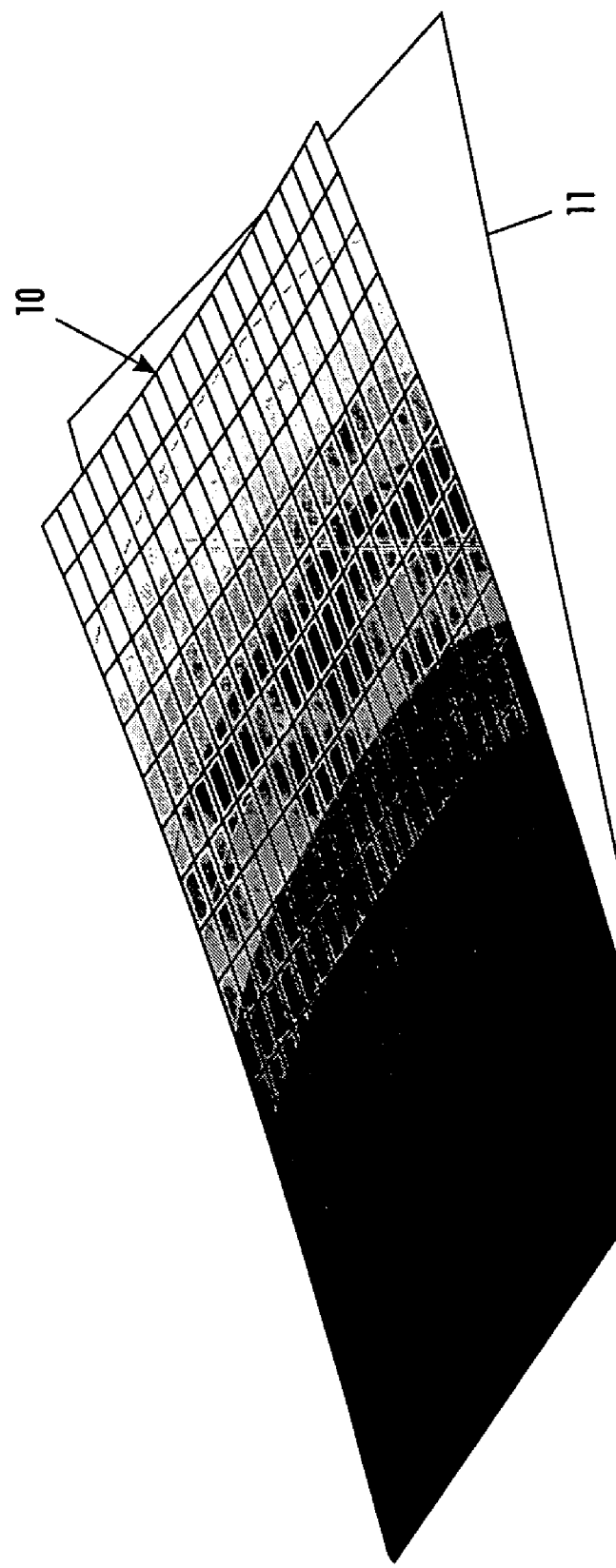

In accordance with the concepts of the present invention, the deformable mirror or reflector is constructed using a free-standing membrane wherein the membrane is held only at one point or along one edge, referred to here as a cantilever. FIGS. 2 and 3 illustrate two types of cantilever designs according to the concepts of the present invention.

As illustrated in FIG. 2, the deformable mirror or reflector 10 is held to the substrate at a single point. In the example of FIG. 2, the single point is located at approximately the center of the deformable mirror or reflector 10. FIG. 2 uses shading to illustrate the degree of curvature or deformity of the deformable mirror or reflector 10. Furthermore, FIG. 2 illustrates the shape of the deformable mirror or reflector 11 when in a flattened state.

As illustrated in FIG. 3, the deformable mirror or reflector 10 is held to the substrate along a single edge. In the example of FIG. 3, the edge is located at approximately one end of the deformable mirror or reflector 10. FIG. 3 uses shading to illustrate the degree of curvature or deformity of the deformable mirror or reflector 10. Furthermore, FIG. 3 illustrates the shape of the deformable mirror or reflector 11 when in a flattened state.

In the deformable mirror or reflector, in accordance with the concepts of the present invention, the membrane will not be flattened by support structures. Moreover, the deformable mirror or reflector will respond to internal stresses in the membrane and take on a curved shape. If the membrane is lying generally in the x-y plane, the curvature will likely have a z component in both the x and y directions.

If the membrane is attached along one edge (FIG. 3), it could be flat in the vicinity of that edge and curved further from the edge. It could also have some tensile or compressive stress along that attachment edge, which will affect the shape in the vicinity of that edge.

When an electric field is used to move this curved cantilever membrane, the membrane will have more of a bending action rather than a stretching action. Such a cantilevered membrane can be made to have much larger excursions without distortion or failure, than a fixed-fixed beam, for similar sized structures. Such a cantilevered membrane can be made to have a temperature stable shape and therefore have a more controlled threshold voltage for electrostatic actuation. It is noted that flattening an already formed curved free standing membrane, a cantilever, to a high degree of flatness is difficult when using only an electric field, unless it is brought in contact with a flat surface.

With respect to the concepts of the present invention, a high speed, very small apertured, deformable mirror or reflector is provided which can achieve a high degree of flatness when actuated and uses a low cost fabrication process. The deformable mirror or reflector of the present invention is made using an electrode membrane which has a built in stress that causes curvature in both the x and y directions in its natural state with no outside forces acting upon it.

The membrane, according to the concepts of the present invention, in its most general form, is in contact with a highly flat substrate at only one or a few points, or along one edge. The membrane, according to the concepts of the present invention, is designed so that when a voltage is applied to one or more electrodes in the substrate, the membrane comes into intimate contact with the substrate across a large part of its surface, or at a significant number of contact points. The membrane, according to the concepts of the present invention, upon application of the voltage, becomes nearly the same flatness as the substrate. When the voltage is dropped to zero, the mirror springs back to its original position.

The cantilever modulated mirror devices of the present invention have many advantages over other technologies. When compared to the fixed-fixed structures, the mirror excursions can be much larger leading to larger depth of modulation, and temperature changes have a much smaller effect on the device performance.

Compared to the rigid tilting plate mirror devices, U.S. Pat. Nos. 4,710,732 and 5,061,049, the cantilever design of the present invention is much faster, can be easily scaled to smaller sizes, is simpler to build because of fewer steps, does not require maintaining flat mirrors in the relaxed state or in all actuation states, operates using lower voltages, and requires less power. For modulated corner cube retroreflector applications, the requirement of needing less power translates into less energy per bit.

Compared to the liquid crystal on silicon devices used in reflective projection devices, cantilever modulated mirror devices of the present invention have a much higher brightness, much faster switching, wider temperature range of operation, and longer life.

Compared to electro-optic or multiple quantum well modulator absorption devices, the cantilever modulated mirror devices of the present invention requires much lower power or energy for switching and have a much larger extinction ratio.

Figure 4:
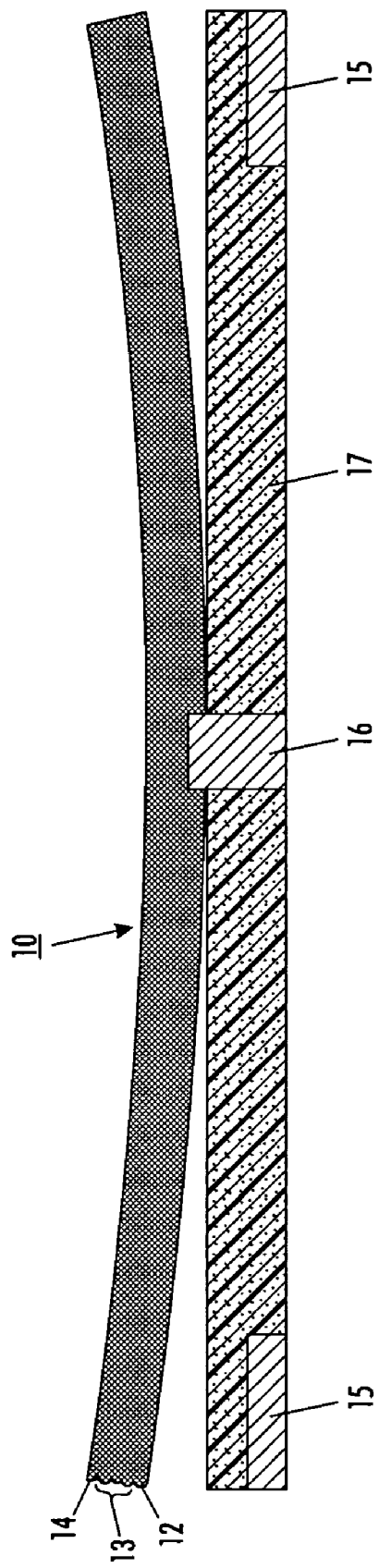
FIG. 4 illustrates a deformable mirror membrane anchored in the center to a flat substrate according to the concepts of the present invention.
Figure 6:
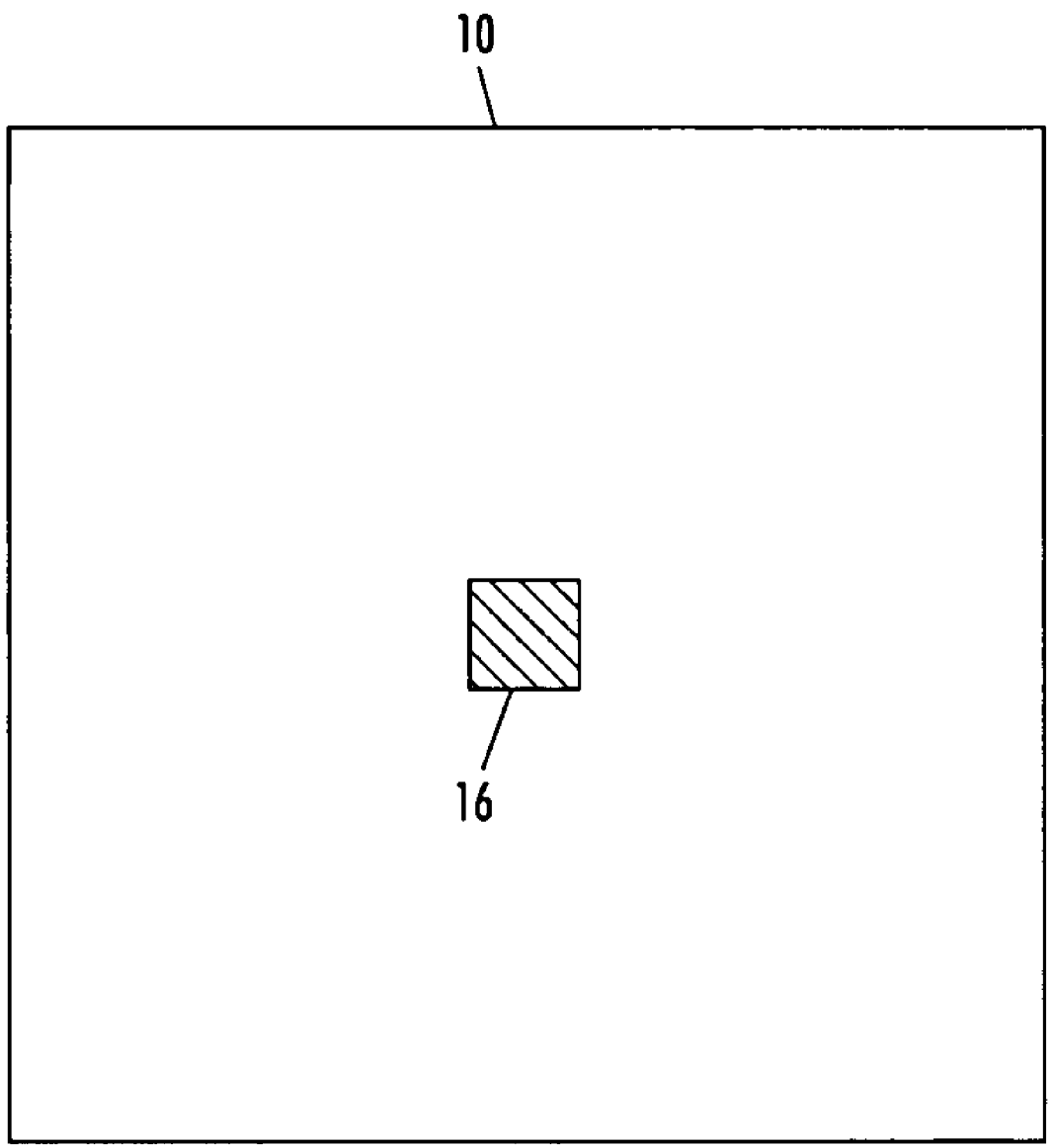
FIG. 6 illustrates a top view of the deformable mirror membrane of FIG. 4 according to the concepts of the present invention.

FIG. 4 shows a deformable mirror or reflector membrane 10 anchored in the center to a flat substrate 17, whereas FIG. 6 shows a top view of the deformable mirror or reflector membrane 10 anchored in the center to a flat substrate by substrate contact 16. The deformable mirror or reflector membrane 10 consists of three layers, an oxide layer 12 at the bottom, an aluminum layer 13 in the middle, and another oxide layer 14 on top. In one embodiment, the deformable mirror or reflector membrane is twenty microns square (twenty microns along each edge), the oxide layers are twenty nanometers thick, and the aluminum layer is fifty nanometers thick.

Figure 5:
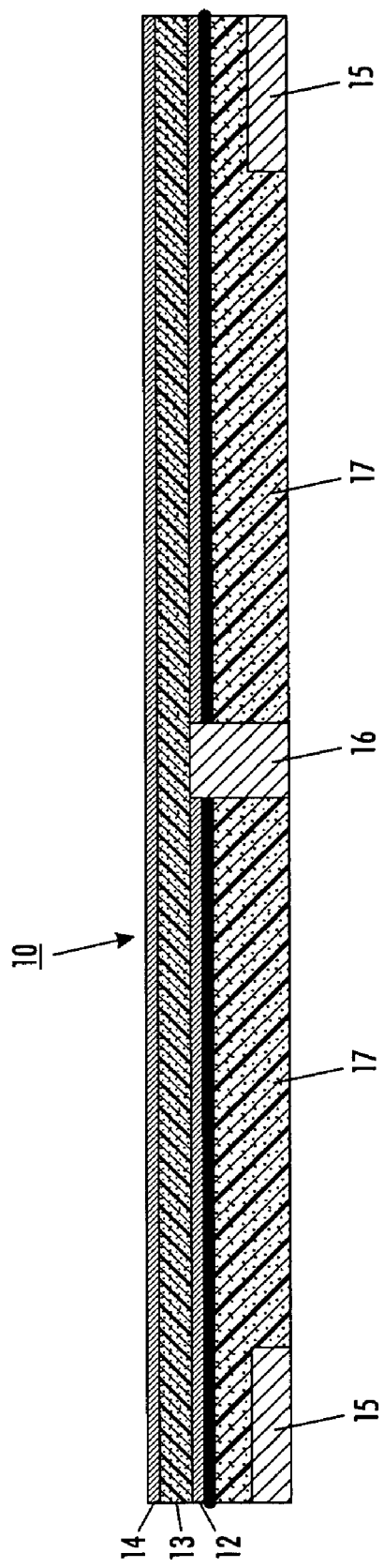
FIG. 5 illustrates the deformable mirror membrane of FIG. 4 in a flattened state according to the concepts of the present invention.

The combined stresses, in the three layers (12, 13 & 14), cause the deformable mirror or reflector membrane 10 to curve upward, as illustrated in FIG. 4, after it is released from the substrate 17. A voltage applied between the substrate contact 16 and outer pulldown electrodes 15 flattens the deformable mirror or reflector membrane 10 against the substrate 17, as illustrated in FIG. 5.

Figure 7:
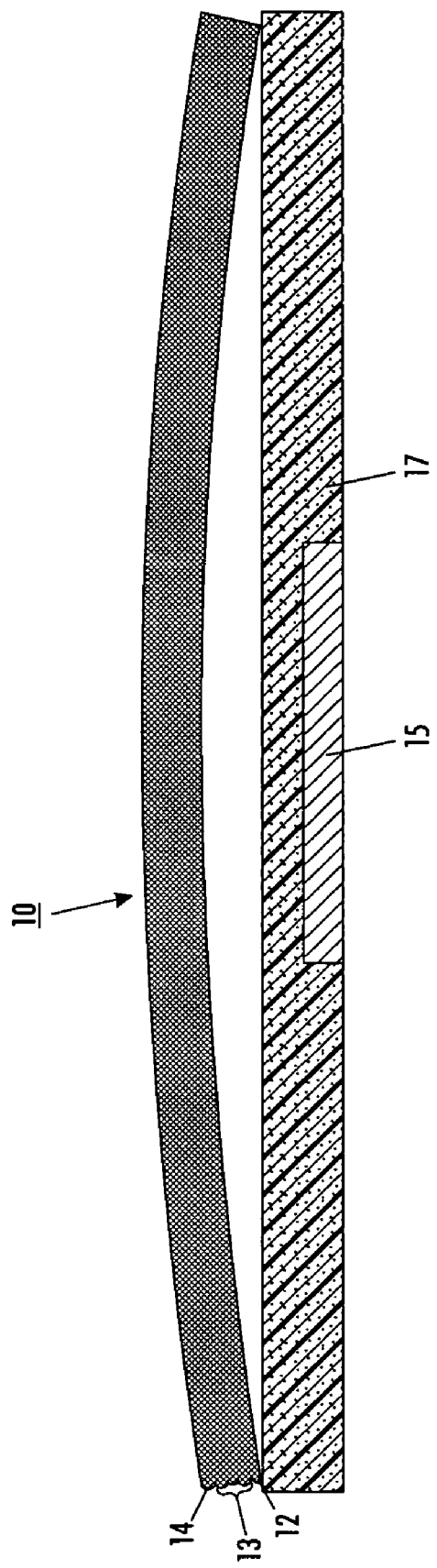
FIG. 7 illustrates a deformable mirror membrane anchored at opposite ends to a flat substrate according to the concepts of the present invention.
Figure 8:
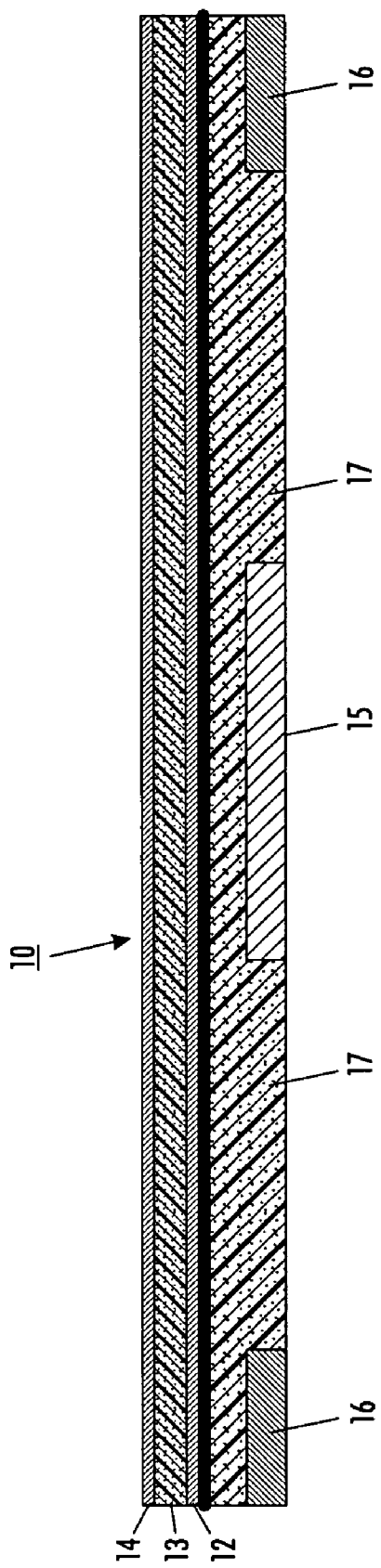
FIG. 8 illustrates the deformable mirror membrane of FIG. 7 in a flattened state according to the concepts of the present invention.
Figure 9:
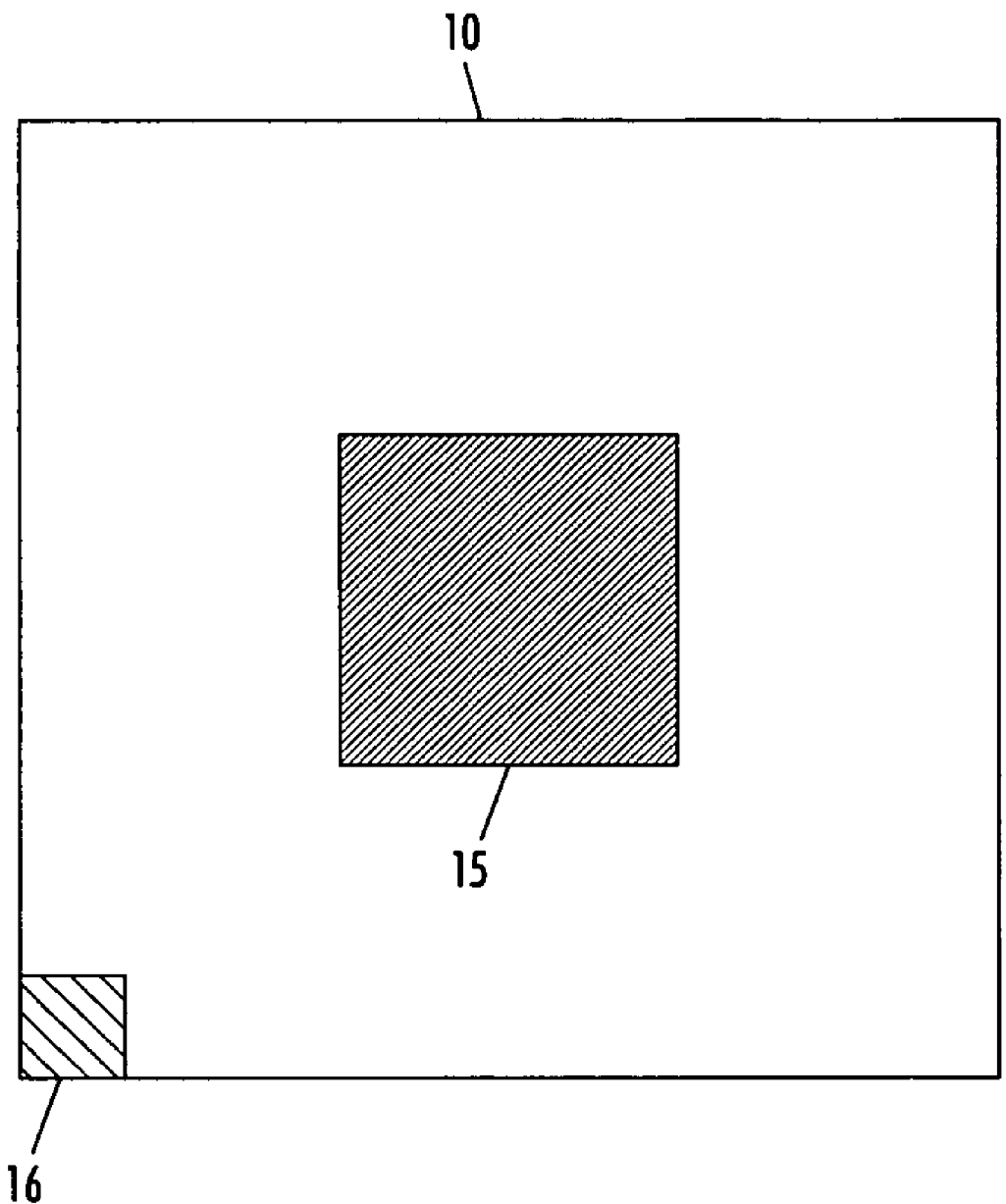
FIG. 9 illustrates a top view of the deformable mirror membrane of FIG. 7 according to the concepts of the present invention.

The deformable mirror or reflector membrane of the present invention can also take other shapes, for example, as illustrated in FIG. 7. As illustrated in FIG. 7, the deformable mirror or reflector membrane 10 is held at a corner and is concave down, whereas FIG. 9 shows a top view of the deformable mirror or reflector membrane 10 anchored at a corner to a flat substrate, having a centered pulldown electrode 15, by substrate contact 16. The deformable mirror or reflector membrane 10 consists of three layers, an oxide layer 12 at the bottom, an aluminum layer 13 in the middle, and another oxide layer 14 on top. In one embodiment, the deformable mirror or reflector membrane is twenty square microns, the oxide layers are twenty nanometers thick, and the aluminum layer is fifty nanometers thick.

The combined stresses, in the three layers (12, 13 & 14), cause the deformable mirror or reflector membrane 10 to curve upward in the center, as illustrated in FIG. 7, after it is released from the substrate 17. A voltage applied to the pulldown electrode 15 in the substrate 17 will again flatten the deformable mirror or reflector membrane 10 against the substrate 17.

Figure 10:
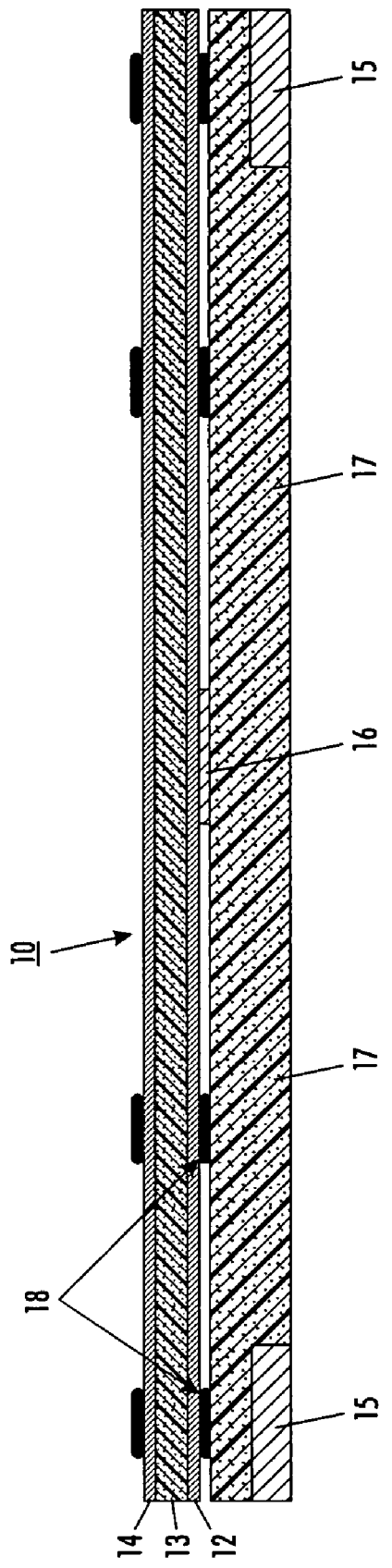
FIG. 10 illustrates a deformable mirror membrane anchored in the center to a flat substrate with posts or dimples formed on the deformable mirror membrane according to the concepts of the present invention.
Figure 11:
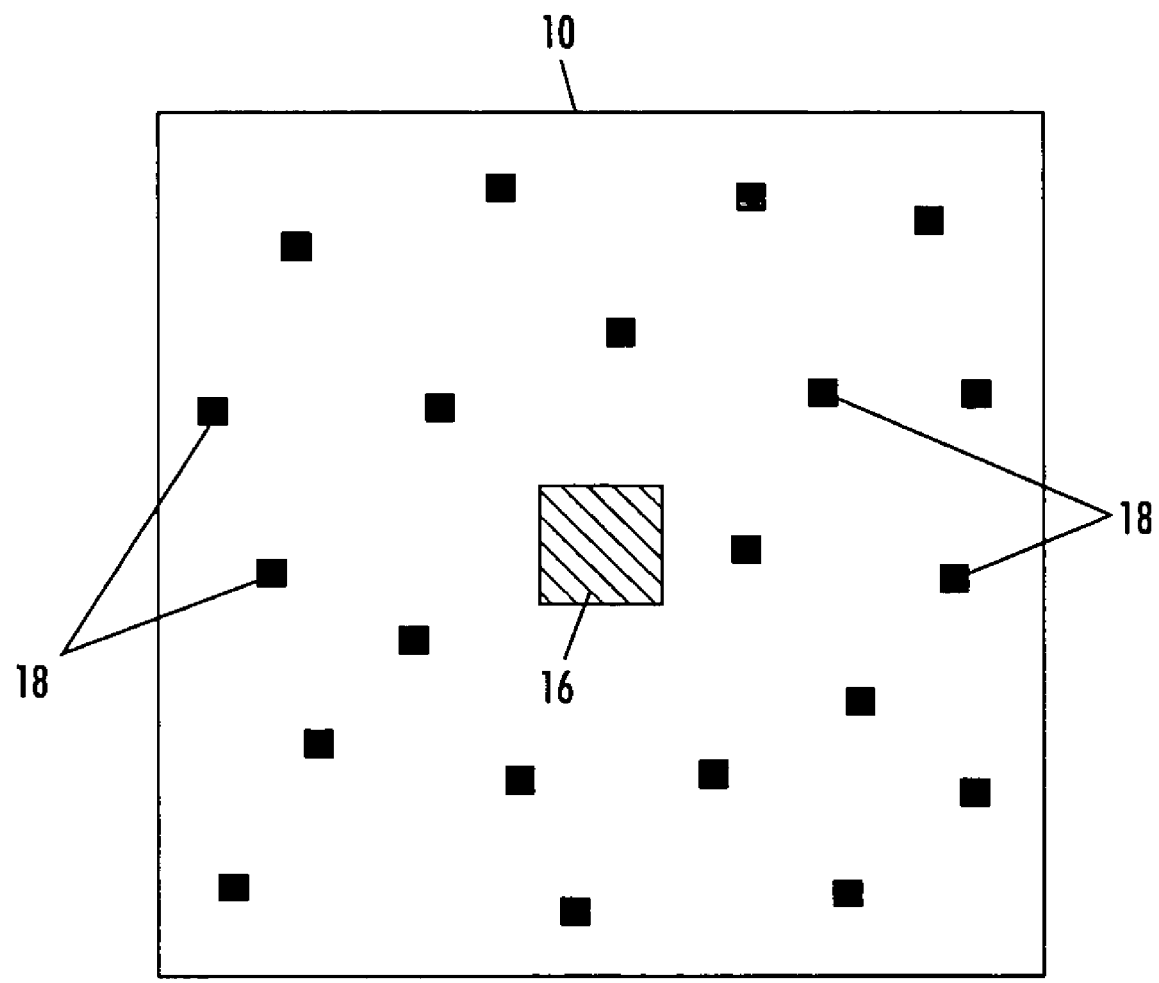
FIG. 11 illustrates a top view of the deformable mirror membrane of FIG. 10 according to the concepts of the present invention.
Figure 12:
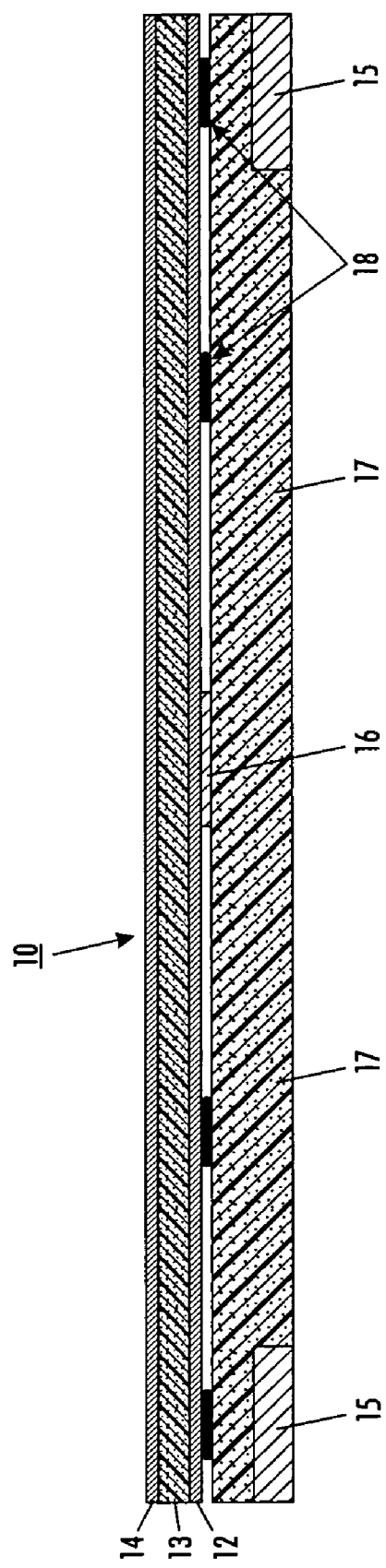
FIG. 12 illustrates a deformable mirror membrane anchored in the center to a flat substrate with posts or dimples formed on the substrate according to the concepts of the present invention.

FIGS. 10 and 12 illustrate the deformable mirror or reflector membrane 10 can be flattened against the surface of the flat substrate 17 through strategically placed dimples or posts 18, whereas FIG. 11 illustrates a top view of the deformable mirror or reflector membrane 10 anchored in the center to a flat substrate by substrate contact 16 with surrounding dimples or posts 18.

FIG. 10 shows a deformable mirror or reflector membrane 10 anchored in the center to a flat substrate 17 with a plurality of dimples or posts 18 formed on the substrate 17, surround the substrate contact 16. The deformable mirror or reflector membrane 10 consists of three layers, an oxide layer 12 at the bottom, an aluminum layer 13 in the middle, and another oxide layer 14 on top. In one embodiment, the deformable mirror or reflector membrane is twenty square microns, the oxide layers are twenty nanometers thick, and the aluminum layer is fifty nanometers thick.

The combined stresses, in the three layers (12, 13 & 14), cause the deformable mirror or reflector membrane 10 to curve upward after it is released from the substrate 17. A voltage applied between the substrate contact 16 and outer pulldown electrodes 15 flattens the deformable mirror or reflector membrane 10 against the plurality of dimples or posts 18 formed on the substrate 17.

The size of the dimples or posts and the surfaces are important in determining the stiction, or stickiness, between the membrane and the substrate. Smaller posts and dimples and a rougher surface at the end of the post will generally have less stiction. One could have posts or dimples as small as 10 nm or perhaps smaller to provide low stiction.

FIG. 12 shows a deformable mirror or reflector membrane 10 anchored in the center to a flat substrate 17 with a plurality of dimples or posts 18 formed on the deformable mirror or reflector membrane 10, surrounding a center point of the deformable mirror or reflector membrane 10. The deformable mirror or reflector membrane 10 consists of three layers, an oxide layer 12 at the bottom, an aluminum layer 13 in the middle, and another oxide layer 14 on top. In one embodiment, the deformable mirror or reflector membrane is twenty microns square, the oxide layers are twenty nanometers thick, and the aluminum layer is fifty nanometers thick.

The combined stresses, in the three layers (12, 13 & 14), cause the deformable mirror or reflector membrane 10 to curve upward after it is released from the substrate 17. A voltage applied between the substrate contact 16 and outer pulldown electrodes 15 flattens the deformable mirror or reflector membrane 10 by bringing the plurality of dimples or posts 18 formed on the deformable mirror or reflector membrane 10 in contact with the substrate 17.

If the dimples or posts 18 are sufficiently close together, the curvature of the deformable mirror or reflector membrane 10 between dimples or posts 18 when in contact with the substrate 17 becomes negligible for any given application. The dimples or posts 18 result in a gap between the deformable mirror or reflector membrane 10 and the flat substrate 17 over the large majority of the area which can result in easier fabrication and less likelihood for stiction.

The easier fabrications results from the use of a thicker release layer which is easier to remove.

The stiction can occur when the restoring force is low, which happens when the deformable mirror or reflector membrane has a relatively small curvature and low actuation voltage and where the van der Waals and other attractive forces can become quite large when the spacing is less than ten nanometers. Additional stiction forces can come from absorbed water vapor collection in narrow gaps.

Figure 13:
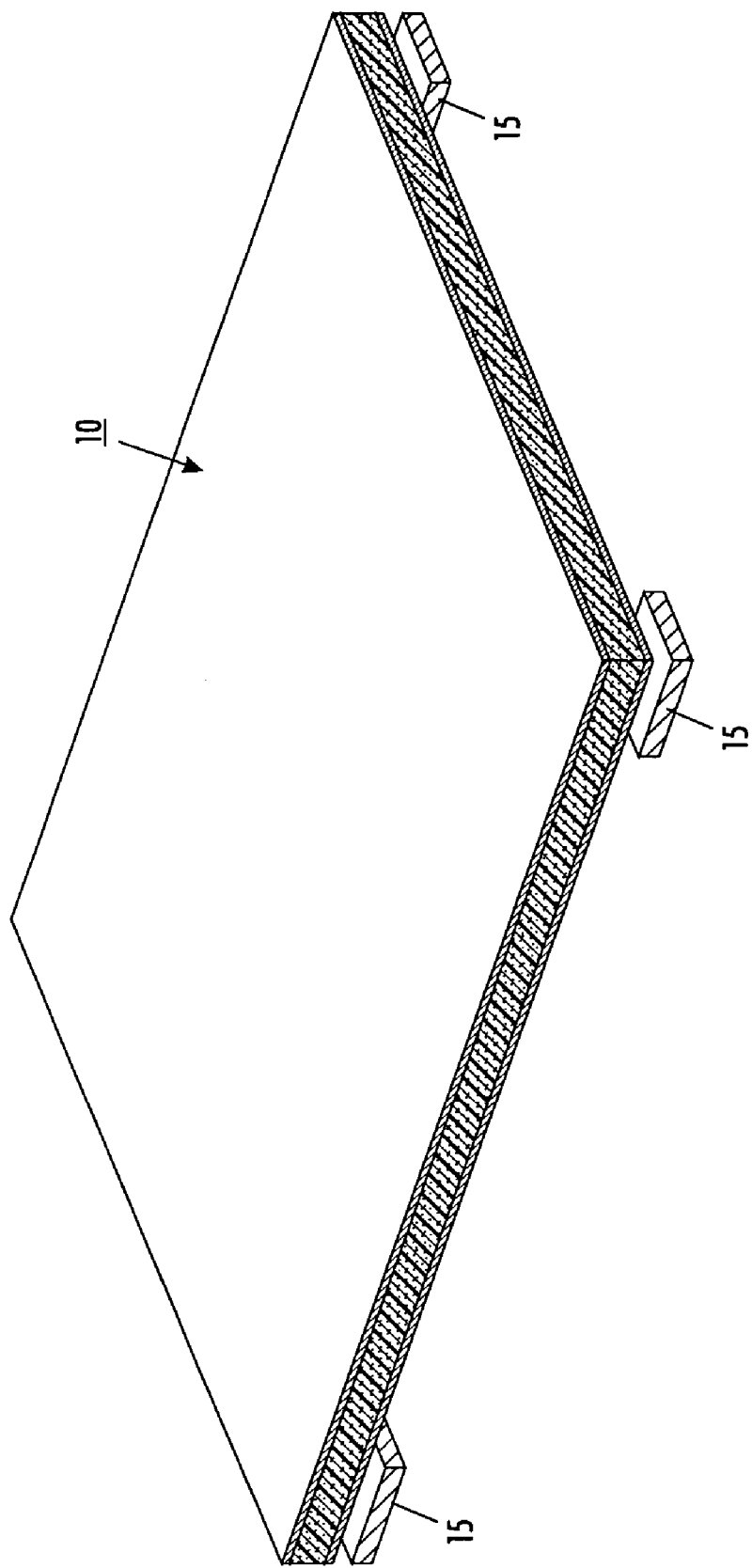
FIG. 13 illustrates one example of a pulldown electrode design according to the concepts of the present invention.
Figure 14:
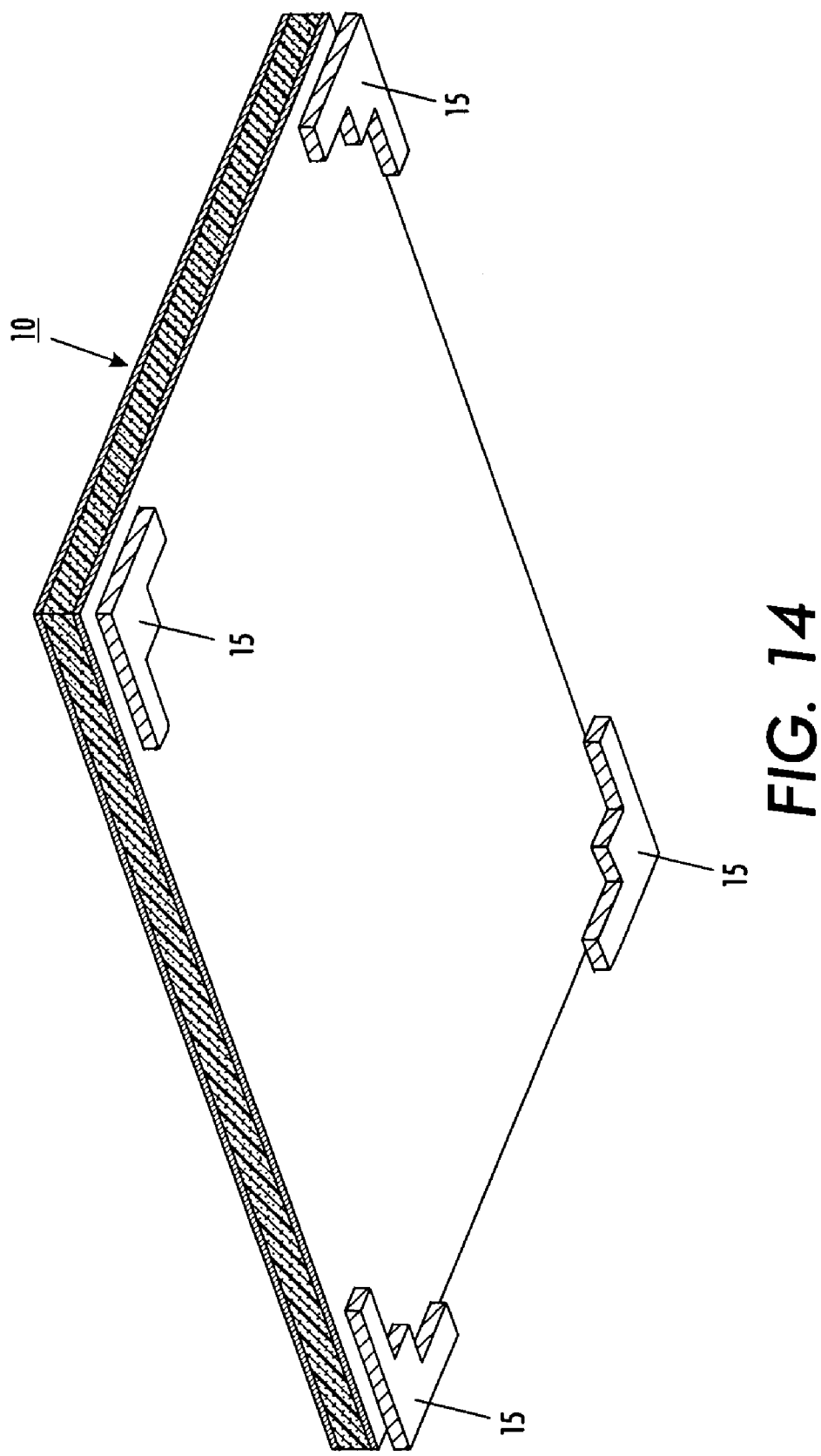
FIG. 14 illustrates another example of a pulldown electrode design according to the concepts of the present invention.

The pulldown electrodes 15, as illustrated in FIGS. 13 and 14, can have a small fraction of the area if the pulldown electrodes 15 are placed near the edges of the deformable mirror or reflector membrane 10 that is being flattened because as the deformable mirror or reflector membrane 10 flattens, the deformable mirror or reflector membrane 10 will contact the flat substrate first near the center. As the deformable mirror or reflector membrane 10 continues to flatten, the contact area moves outward while, due to the stress in the deformable mirror or reflector membrane 10, the areas already contacted remain in contact.

The voltage applied to the deformable mirror or reflector membrane 10 to flatten it can be quite small, of the order of 1 volt, using small curvatures (small stress differential). The advantage of using small pulldown electrodes 15 and small pulldown voltages is the very low energy required for the pulldown which is important for some communications applications to be described later.

Figure 15:
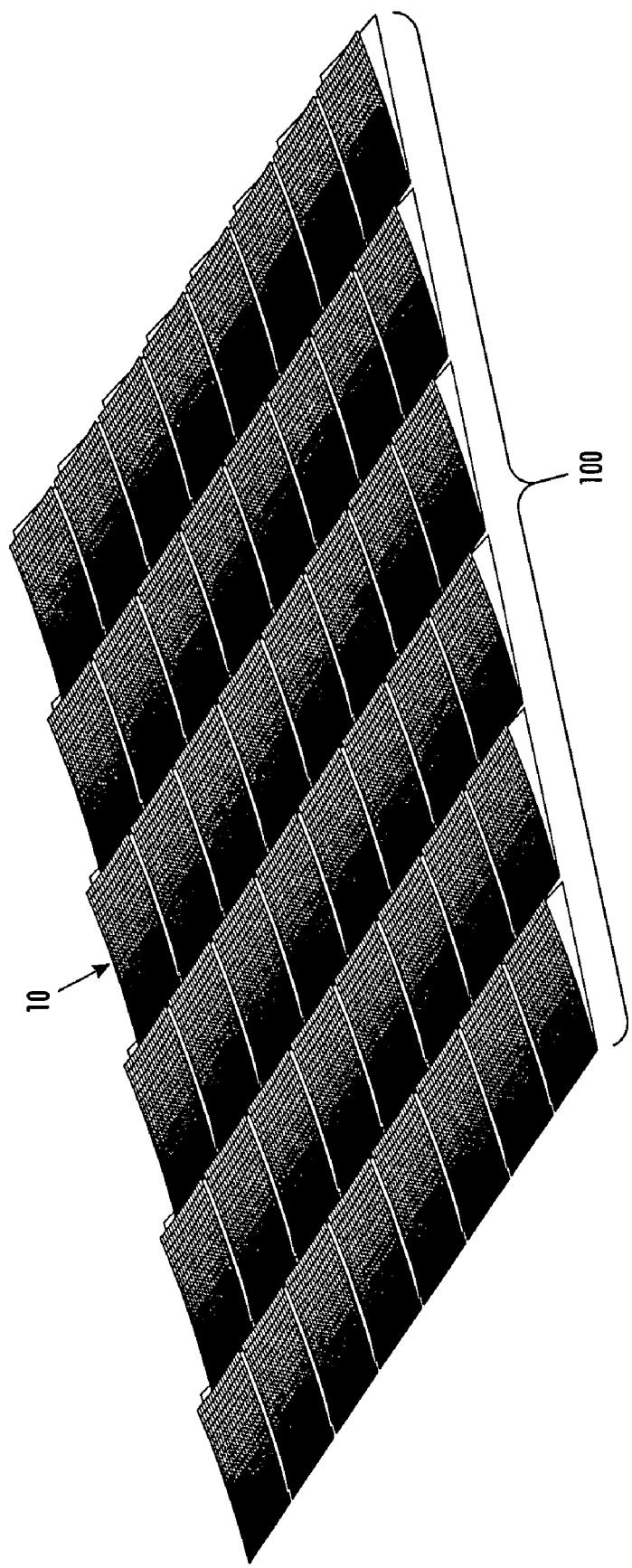
FIG. 15 illustrates an array of deformable mirror devices according to the concepts of the present invention.

One of the many applications for the deformable mirror or reflector membrane, as described above, is the use in large array devices. The array 100 in FIG. 15 shows a plurality of cantilever or deformable mirror or reflector membrane devices 10 having a design where the individual deformable mirror or reflector membranes 10 are anchored along one edge. The individual deformable mirror or reflector membranes 10 in the array 100 could be connected so that all the individual deformable mirror or reflector membranes 10 are part of one electrode and all the pulldown electrodes are connected together to form one electrode. In this example, the array 100 becomes a simple two terminal device where all the individual deformable mirror or reflector membranes 10 in the array actuate in unison and could be made into a large area modulated mirror. The speed of modulation could be as fast as the individual deformable mirror or reflector membranes 10.

This array is useful for the corner cube retroreflector application which will be discussed below. Alternatively, the individual deformable mirror or reflector membranes could be actuated individually through the use of an integrated circuit whose components are mostly beneath the mirrors. After fabrication of the circuit, a flat insulating surface would be created with feedthroughs for the electrodes and the mirrors would be fabricated on top. This type of device structure would be used for a display.

Figure 16:
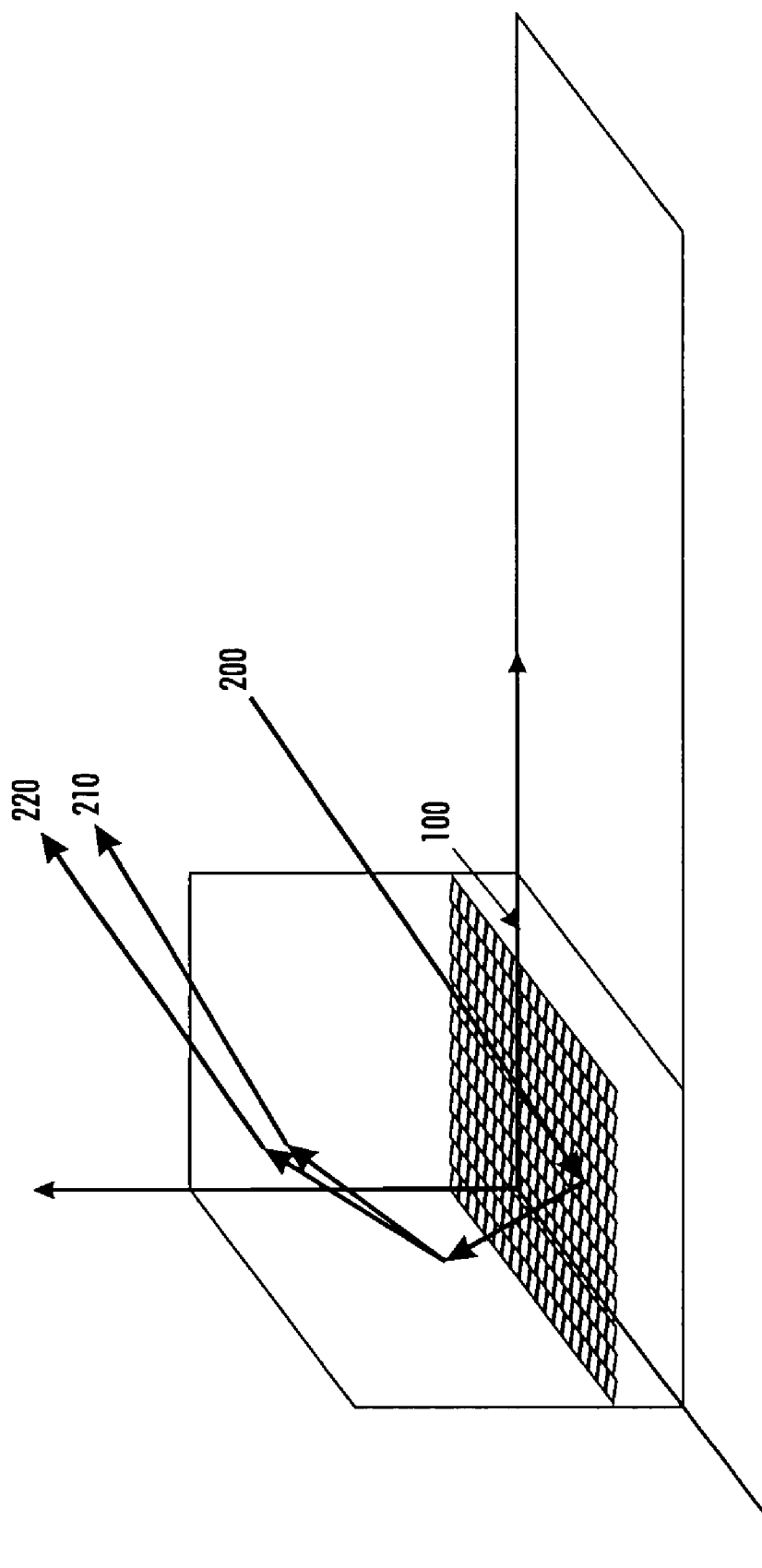
FIG. 16 illustrates a modulated retroreflector using deformable mirror devices according to the concepts of the present invention.

A schematic of a modulated corner cube retroreflector is shown in FIG. 16. Each incoming ray of light or infrared radiation 200 coming through the usable aperture will reflect off of all three mirrors and will be returned to its source. When one of the mirrors loses its flatness or is oriented a few milli-degrees off perpendicular orientation relative to the other two mirrors, all the reflected rays will be slightly diverted from the return path to the source. With the mirror array described earlier, the return beam 210 & 220 will be modulated in its intensity as much as ten to one or more as the individual deformable mirror or reflector membranes in the deformable mirror or reflector membrane array 100 are alternately flattened or return to their curved state.

Figure 17:
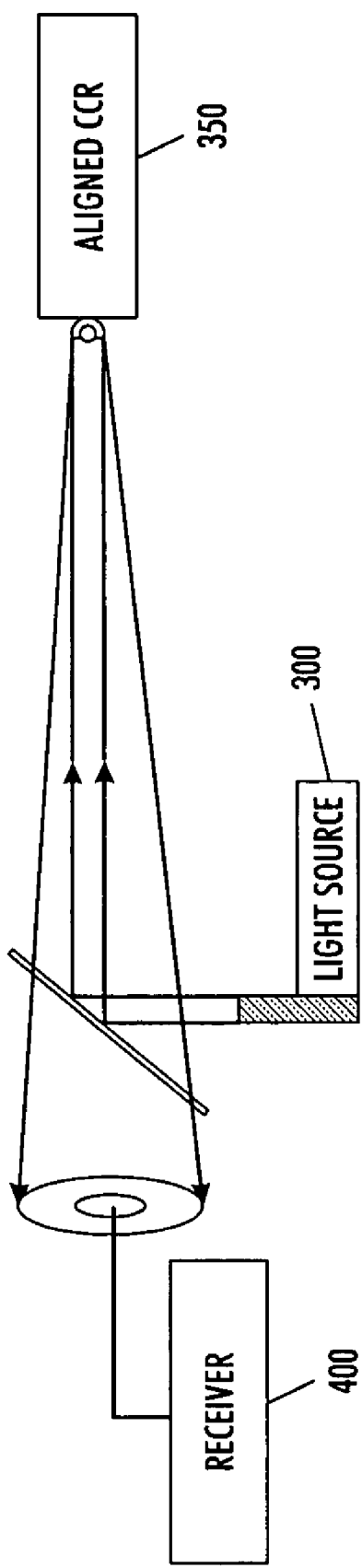
FIGS. 17 and 18 show the possible operational states of a modulated retroreflector using deformable mirror devices according to the concepts of the present invention.

FIG. 17 shows the results of a beam pattern with proper mirror alignment. In this example, a light source 300 produces a light beam which is directed towards an aligned corner cube retroreflector 350. The light is properly reflected back and collected by the receiver 400.

Figure 18:
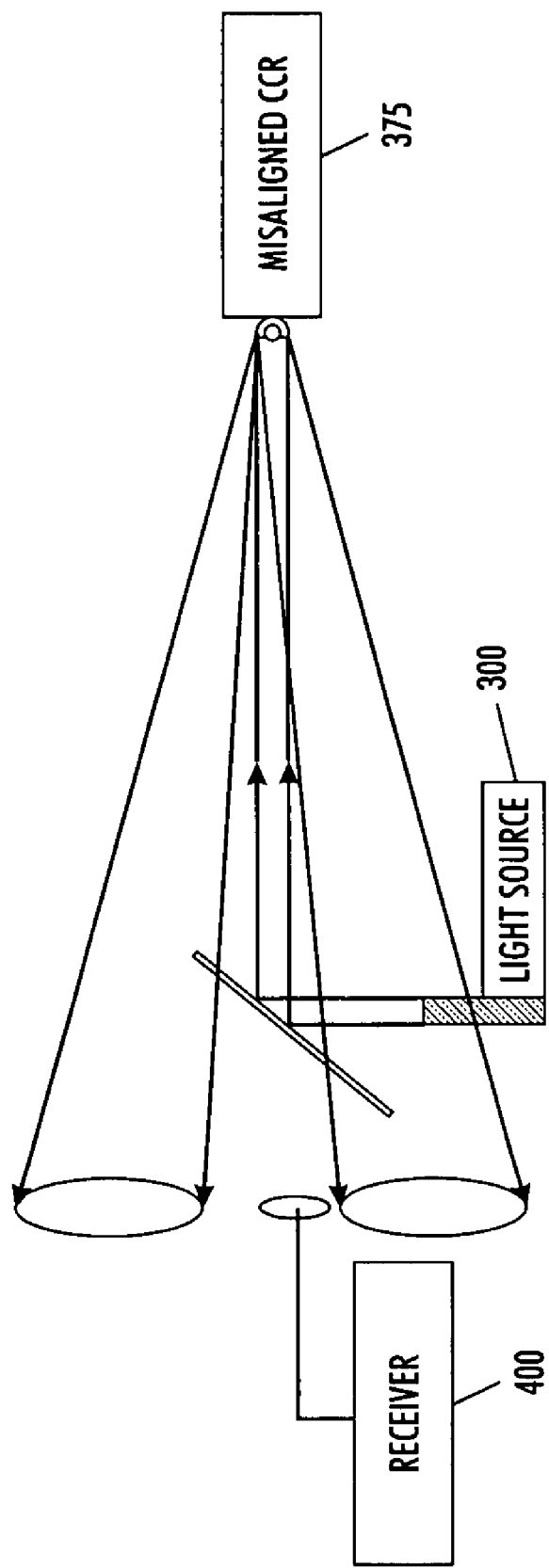

FIG. 18, on the other hand, shows the effect of misaligned deformable mirror or reflector membranes in the modulated corner cube retroreflector. In this example, a light source 300 produces a light beam which is directed towards a misaligned corner cube retroreflector 375. The light is misdirected from it proper reflected path such that the reflected light cannot be collected by the receiver 400.

Figure 19:
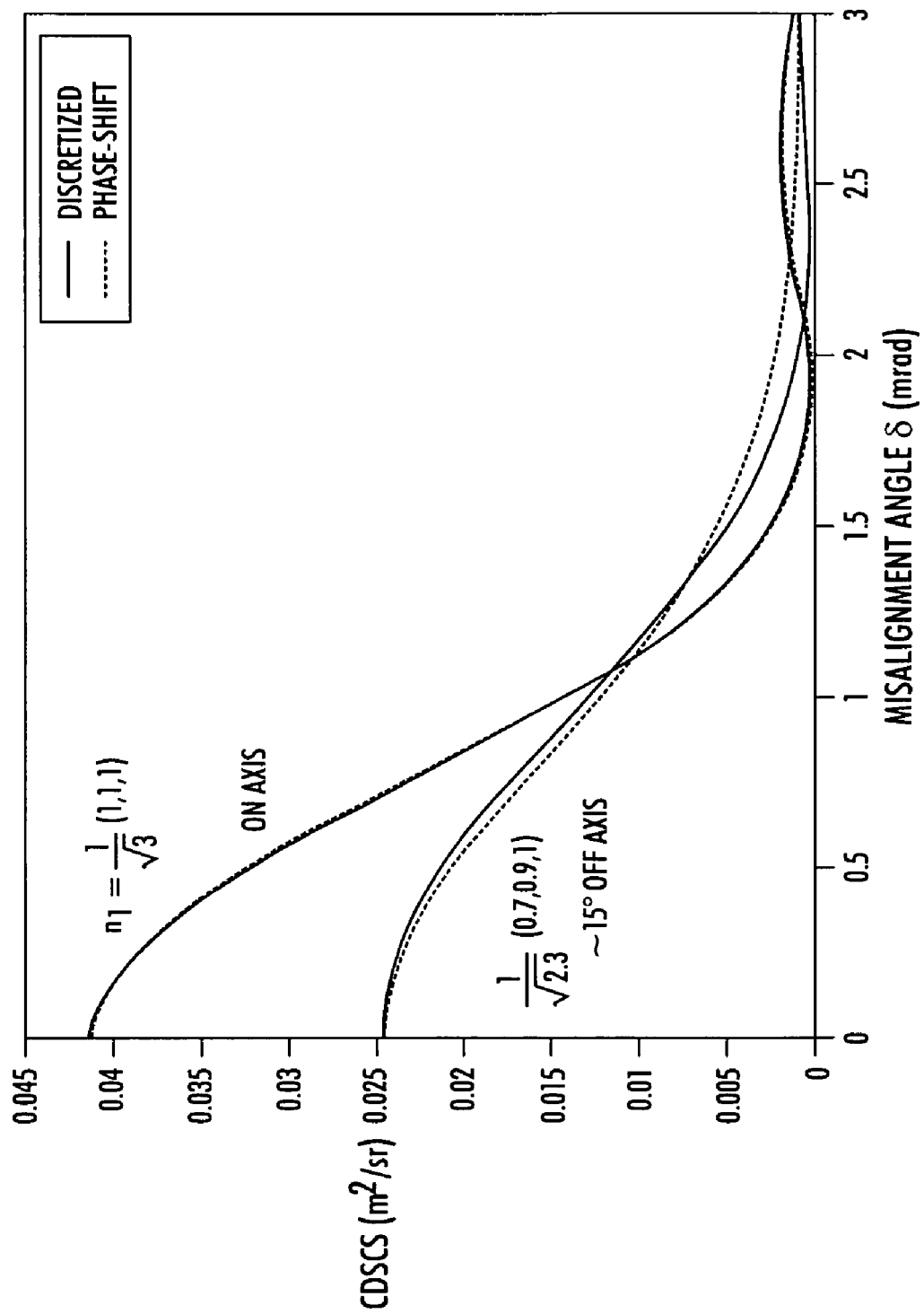
FIG. 19 illustrates the effect of misalignment of one of the mirrors on the reflection intensity.

FIG. 19 shows the effect of a misalignment of one of the mirrors on the reflection intensity. As the misalignment angle increases, the reflection intensity drops sharply.

FIGS. 20 to 37 show top views and sectional views of schematics of a number of examples of cantilever or deformable mirror or reflector membrane designs.

Figure 20:
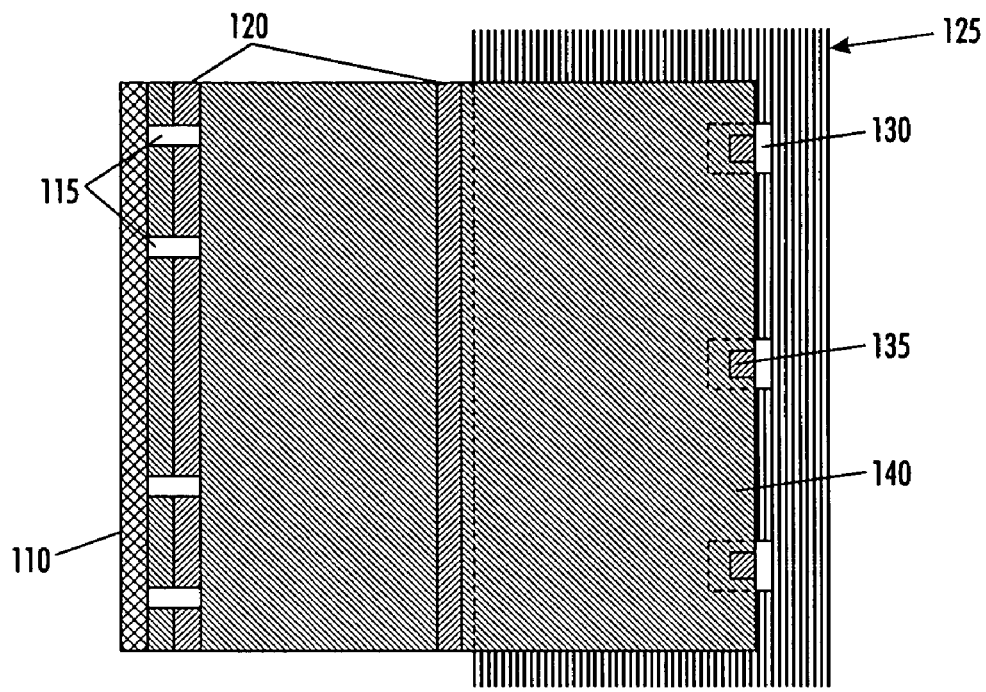
FIGS. 20 through 22 illustrate another example of a deformable mirror membrane according to the concepts of the present invention.
Figure 22:
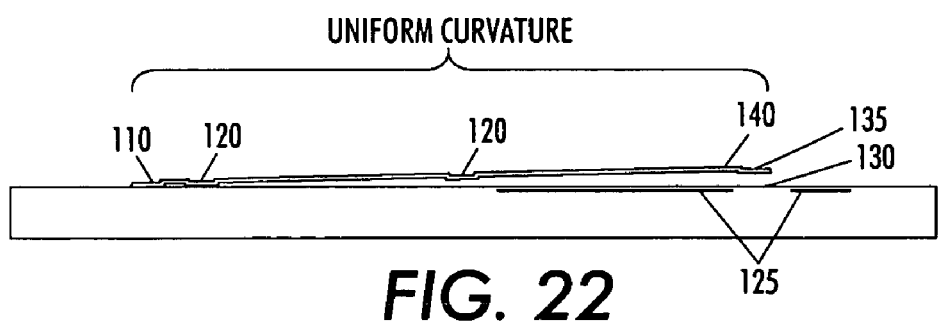

FIG. 20 shows a cantilever electrode or deformable mirror or reflector membrane 140 attached along one edge 110 with some slits 115 to relieve stress at the edge 110. The deformable mirror or reflector membrane 140 has a uniform upward curvature from the attached end 110 to the non-attached end, as illustrated in FIG. 22.

Figure 21:
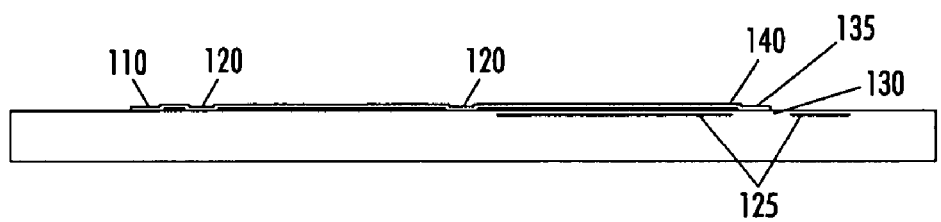

The pulldown electrode 125 will pull down the deformable mirror or reflector membrane 140 when the voltage is applied between it and the deformable mirror or reflector membrane 140. In this example, the deformable mirror or reflector membrane 140 has dimples 135 and ridges 120 which become the contact points (as illustrated in FIG. 21) when the deformable mirror or reflector membrane 140 is flattened on the substrate. It is noted that the dimples or posts 135 and ridges 120 may also be formed on the substrate.

The space between the posts 135 and ridges 120 and the deformable mirror or reflector membrane's stress is such that when, as illustrated in FIG. 21, the deformable mirror or reflector membrane 140 is pulled down all posts 135 and ridges 120 are in contact with the substrate and the surface curvature between posts 135 and ridges 120 is negligible.

The posts 135 and ridges 120 are made small and narrow and there are holes 130 in the pulldown electrode 125 surrounding the contact area 135 to minimize the electric field in the contact area and to minimize stiction. When the posts 135 and ridges 120 are in the membrane they are also minimized to avoid light scattering.

Figure 23:
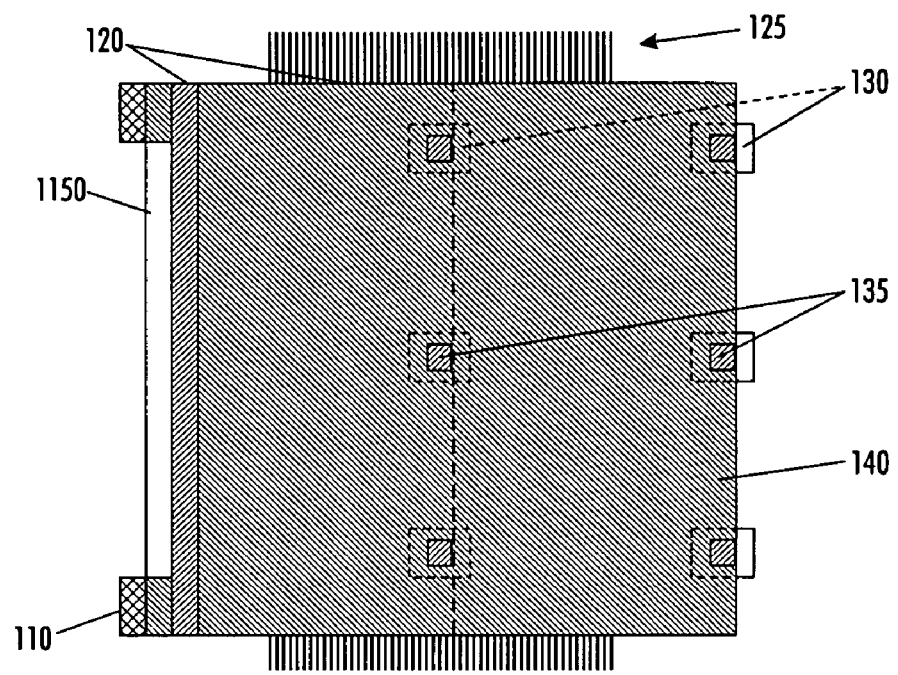
FIGS. 23 through 25 illustrate another example of a deformable mirror membrane according to the concepts of the present invention.
Figure 25:
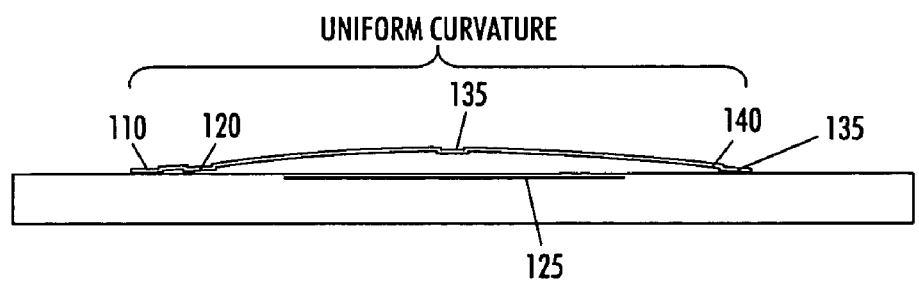

FIG. 23 shows a cantilever electrode or deformable mirror or reflector membrane 140 attached along one edge 110 with a slot 1150 to relieve stress at the edge 110. The deformable mirror or reflector membrane 140 has a uniform concave curvature from the attached end 110 to the non-attached end with the center point being the furthest distance from the substrate, as illustrated in FIG. 25.

Figure 24:
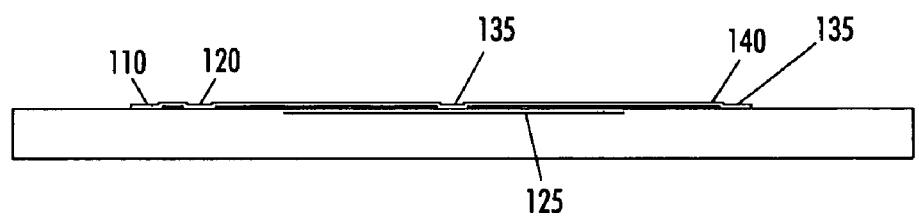

The pulldown electrode 125, located in the center of the deformable mirror or reflector membrane 140, will pull down the deformable mirror or reflector membrane 140 when the voltage is applied between it and the deformable mirror or reflector membrane 140. In this example, the deformable mirror or reflector membrane 140 has posts 135 and a ridge 120 which become the contact points (as illustrated in FIG. 24) when the deformable mirror or reflector membrane 140 is flattened on the substrate. It is noted that the posts 135 and ridge 120 may also be formed on the substrate.

The space between the posts 135 and ridge 120 and the deformable mirror or reflector membrane's stress is such that when, as illustrated in FIG. 24, the deformable mirror or reflector membrane 140 is pulled down all posts 135 and ridge 120 are in contact with the substrate and the surface curvature between posts 135 and ridge 120 is negligible.

The posts 135 and ridge 120 are made small and narrow and there are holes 130 in the pulldown electrode 125 surrounding the contact area 135 to minimize electric field in the contact area and to minimize stiction. When the posts 135 and ridge 120 are in the membrane they are also minimized to avoid light scattering.

Figure 26:
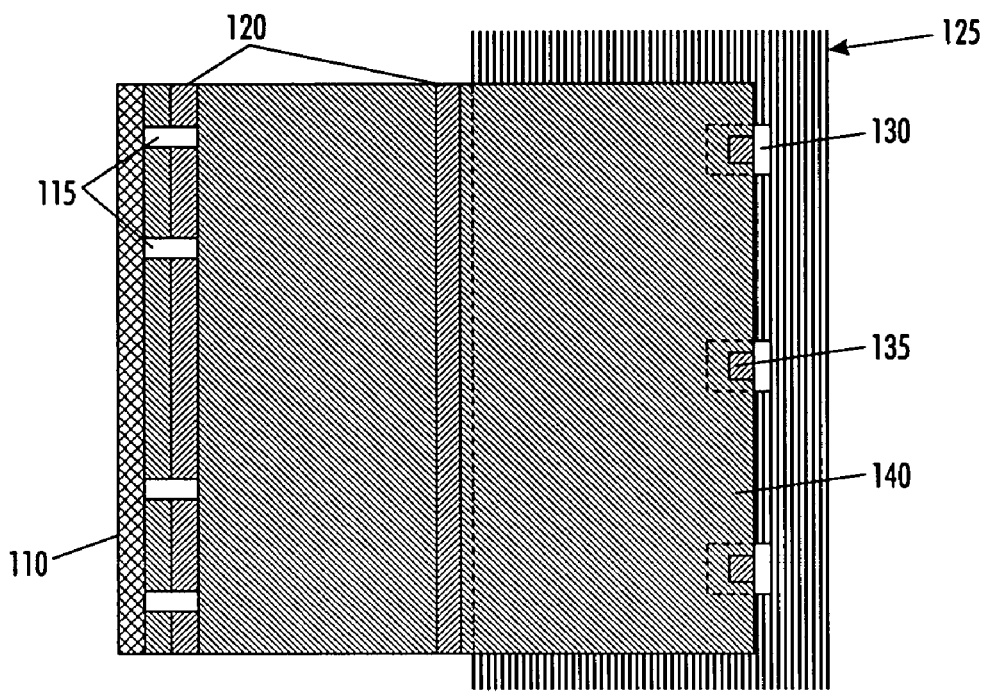
FIGS. 26 through 28 illustrate another example of a deformable mirror membrane according to the concepts of the present invention.
Figure 28:
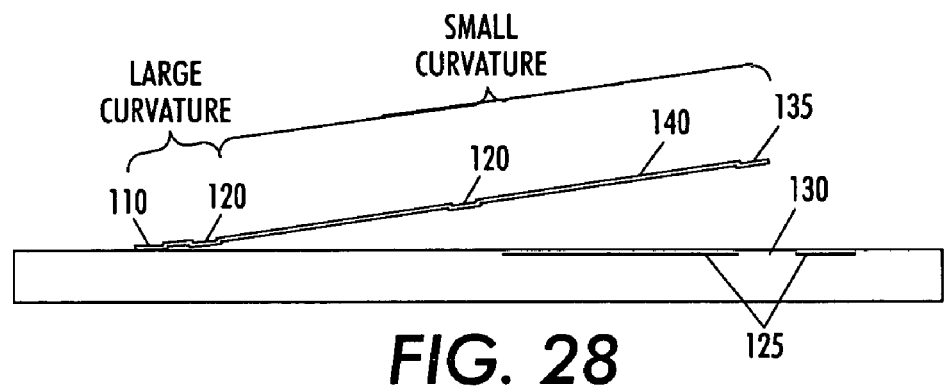

FIG. 26 shows a cantilever electrode or deformable mirror or reflector membrane 140 attached along one edge 110 with slits 1155 to relieve stress at the edge 110. The deformable mirror or reflector membrane 140 has a non-uniform curvature from the attached end 110 to the non-attached end, as illustrated in FIG. 28. In this example, the curvature along the attachment edge 110 is made to be larger than the rest of the deformable mirror or reflector membrane 140 so that the edge furthest from the attachment edge 110 comes up higher when there is no voltage.

Figure 27:
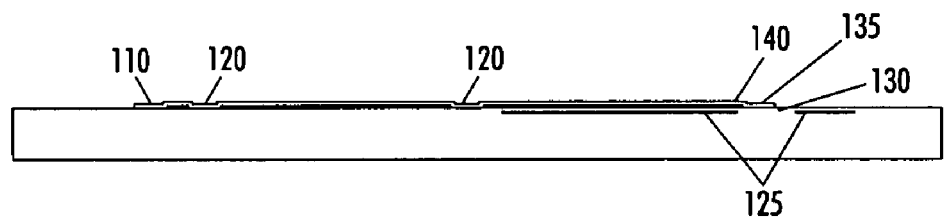

The pulldown electrode 125 will pull down the deformable mirror or reflector membrane 140 when the voltage is applied between it and the deformable mirror or reflector membrane 140. In this example, the deformable mirror or reflector membrane 140 has posts 135 and ridges 120 which become the contact points (as illustrated in FIG. 27) when the deformable mirror or reflector membrane 140 is flattened on the substrate. It is noted that the posts 135 and ridges 120 may also be formed on the substrate.

The space between the posts 135 and ridges 120 and the deformable mirror or reflector membrane's stress is such that when, as illustrated in FIG. 27, the deformable mirror or reflector membrane 140 is pulled down all posts 135 and ridges 120 are in contact with the substrate and the surface curvature between posts 135 and ridges 120 is negligible.

The posts 135 and ridges 120 are made small and narrow and there are holes 130 in the pull down electrode 125 surrounding the contact area 135 to minimize stiction. The posts 135 and ridges 120 are also minimized to avoid light scattering.

Figure 29:
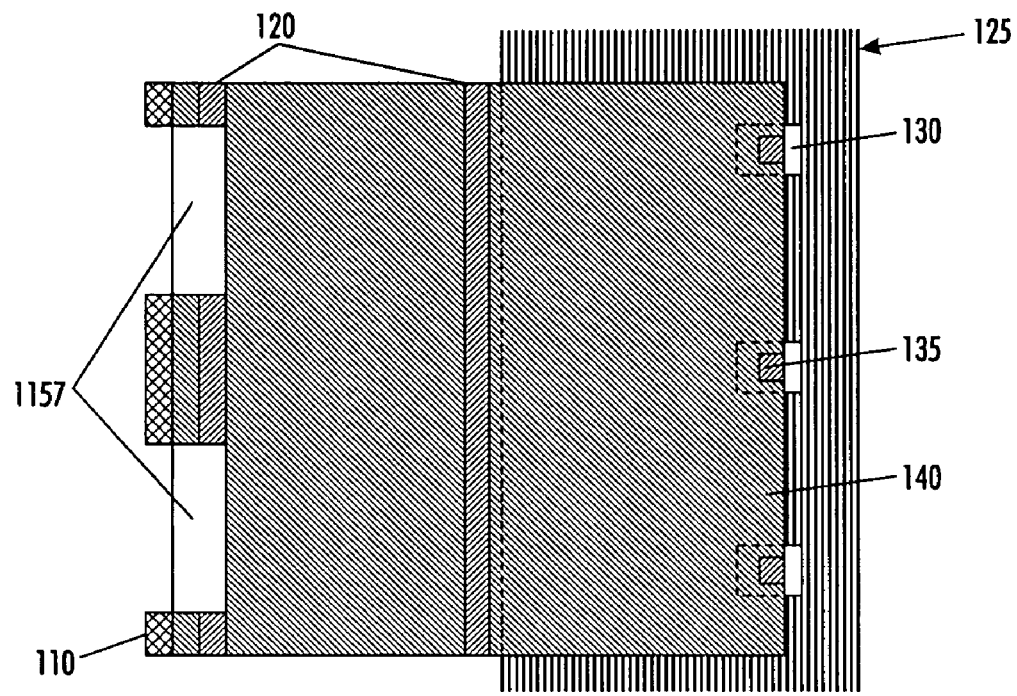
FIGS. 29 through 31 illustrate another example of a deformable mirror membrane according to the concepts of the present invention.
Figure 31:
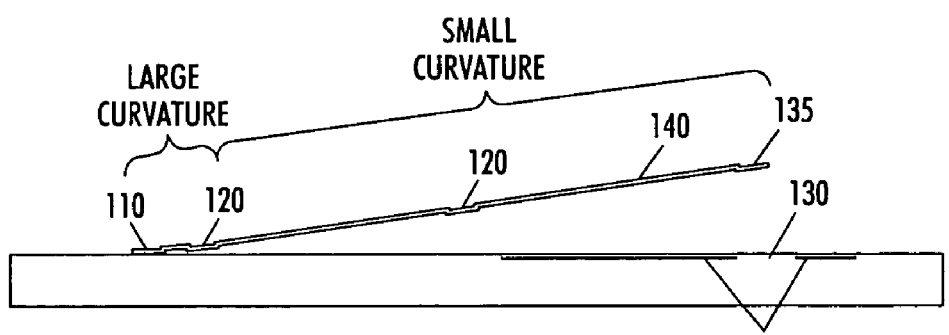

FIG. 29 shows a cantilever electrode or deformable mirror or reflector membrane 140 attached along one edge 110 with cutaways 1157 to relieve stress at the edge 110. The deformable mirror or reflector membrane 140 has a non-uniform curvature from the attached end 110 to the non-attached end, as illustrated in FIG. 31. In this example, the curvature along the attachment edge 110 is made to be larger that the rest of the deformable mirror or reflector membrane 140 so that the edge furthest from the attachment edge 110 comes up higher when there is no voltage. The cutaways 1157 are placed along the attachment edge 110 to make the deformable mirror or reflector membrane 140 more flexible at the attachment edge 110, thereby allowing the deformable mirror or reflector membrane 140 to be more easily flattened.

Figure 30:
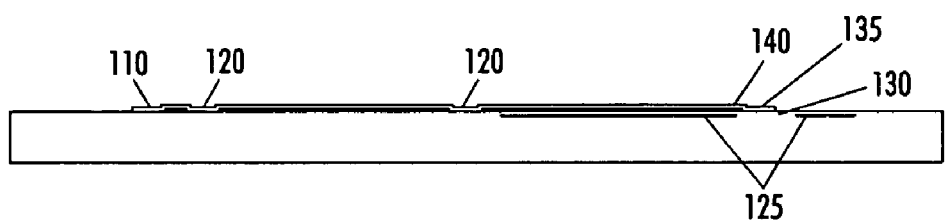

The pulldown electrode 125 will pull down the deformable mirror or reflector membrane 140 when the voltage is applied between it and the deformable mirror or reflector membrane 140. In this example, the deformable mirror or reflector membrane 140 has posts 135 and ridges 120 which become the contact points (as illustrated in FIG. 30) when the deformable mirror or reflector membrane 140 is flattened on the substrate. It is noted that the posts 135 and ridges 120 may also be formed on the substrate.

The space between the posts 135 and ridges 120 and the deformable mirror or reflector membrane's stress is such that when, as illustrated in FIG. 30, the deformable mirror or reflector membrane 140 is pulled down all posts 135 and ridges 120 are in contact with the substrate and the surface curvature between posts 135 and ridges 120 is negligible.

The posts 135 and ridges 120 are made small and narrow and there are holes 130 in the pulldown electrode 125 surrounding the contact area 135 to minimize stiction. The posts 135 and ridges 120 are also minimized to avoid light scattering.

Figure 32:
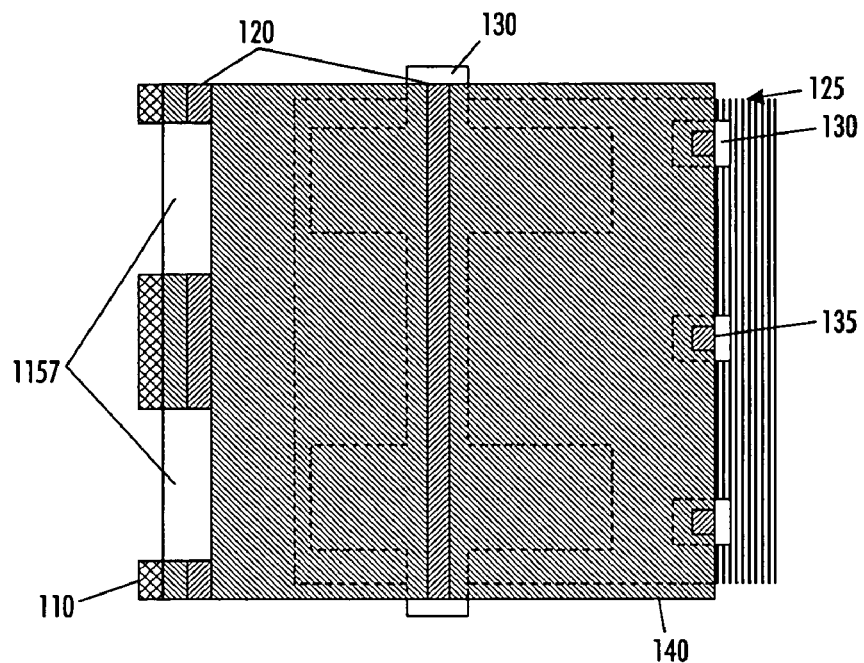
FIGS. 32 through 34 illustrate another example of a deformable mirror membrane according to the concepts of the present invention.
Figure 34:
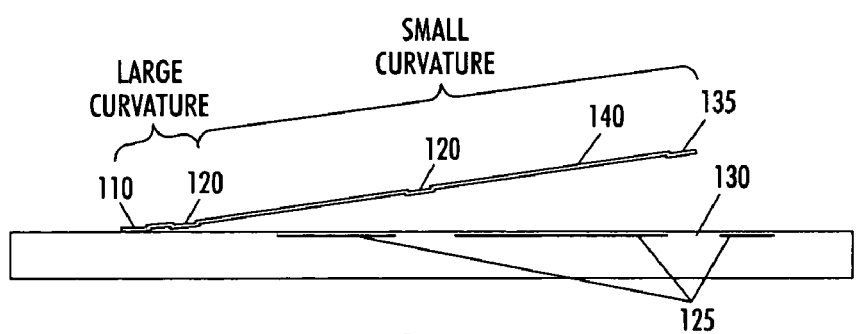

FIG. 32 shows a cantilever electrode or deformable mirror or reflector membrane 140 attached along one edge 110 with cutaways 1157 to relieve stress at the edge 110. The deformable mirror or reflector membrane 140 has a non-uniform curvature from the attached end 110 to the non-attached end, as illustrated in FIG. 34. In this example, the curvature along the attachment edge 110 is made to be larger that the rest of the deformable mirror or reflector membrane 140 so that the edge furthest from the attachment edge 110 comes up higher when there is no voltage. The cutaways 1157 are placed along the attachment edge 110 to make the deformable mirror or reflector membrane 140 more flexible at the attachment edge 110, thereby allowing the deformable mirror or reflector membrane 140 to be more easily flattened.

The pulldown electrode 125 will pull down the deformable mirror or reflector membrane 140 when the voltage is applied between it and the deformable mirror or reflector membrane 140. The pulldown electrode 125, as illustrated in FIG. 32, is segmented and shaped so that the force for pull down is higher in the middle of the deformable mirror or reflector membrane 140 which helps in the actuation dynamics. By having the force higher in the middle, the deformable mirror or reflector membrane 140 will have a lesser tendency to pull down along one of the lateral edge before the other.

Figure 33:
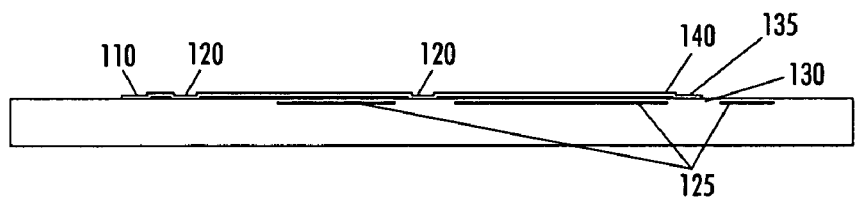

In this example, the deformable mirror or reflector membrane 140 has posts 135 and ridges 120 which become the contact points (as illustrated in FIG. 33) when the deformable mirror or reflector membrane 140 is flattened on the substrate. It is noted that the posts 135 and ridges 120 may also be formed on the substrate.

The space between the posts 135 and ridges 120 and the deformable mirror or reflector membrane's stress is such that when, as illustrated in FIG. 33, the deformable mirror or reflector membrane 140 is pulled down all posts 135 and ridges 120 are in contact with the substrate and the surface curvature between posts 135 and ridges 120 is negligible.

The posts 135 and ridges 120 are made small and narrow and there are holes 130 in the pulldown electrode 125 surrounding the contact area 135 to minimize stiction. The posts 135 and ridges 120 are also minimized to avoid light scattering.

Figure 35:
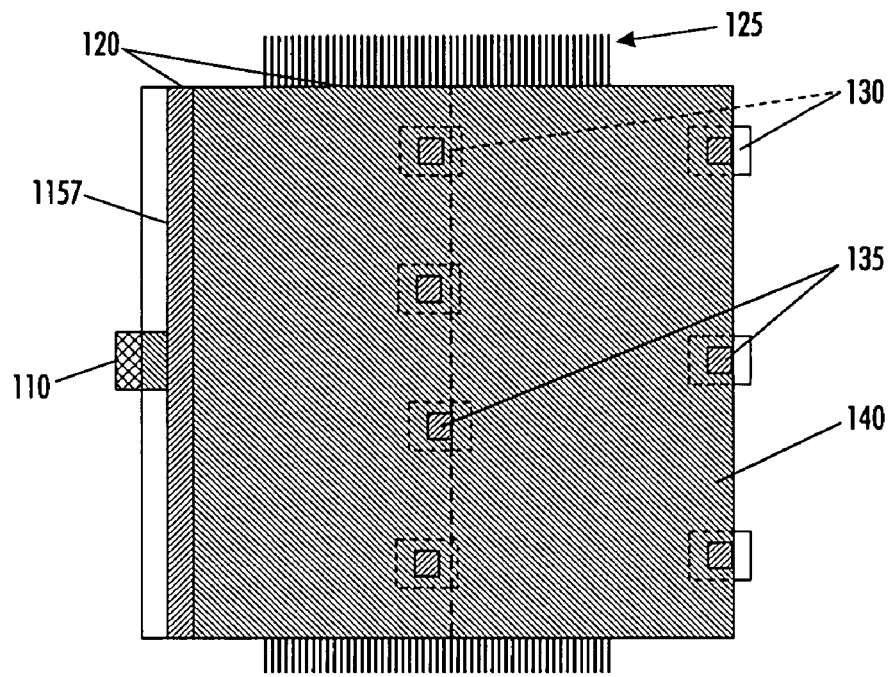
FIGS. 35 through 37 illustrate another example of a deformable mirror membrane according to the concepts of the present invention.
Figure 37:
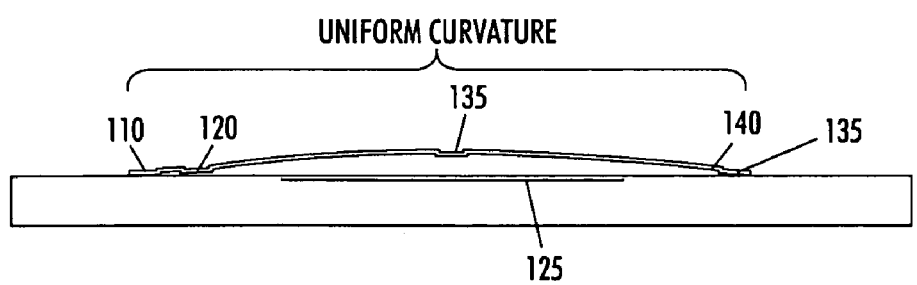

FIG. 35 shows a cantilever electrode or deformable mirror or reflector membrane 140 attached along one edge 110 with cutaways 1157 to relieve stress at the edge 110. The deformable mirror or reflector membrane 140 has a uniform concave curvature from the attached end 110 to the non-attached end, as illustrated in FIG. 37. In this example, the curvature along the attachment edge 110 is made to be larger that the rest of the deformable mirror or reflector membrane 140 so that the edge furthest from the attachment edge 110 comes up higher when there is no voltage. The cutaways 1157 are placed along the attachment edge 110 to make the deformable mirror or reflector membrane 140 more flexible at the attachment edge 110, thereby allowing the deformable mirror or reflector membrane 140 to be more easily flattened. In this example, the attachment edge 110 is greatly reduced, thereby reducing the edge stress and curvature and helping make the deformable mirror or reflector membrane 140 easier to flatten.

Figure 36:
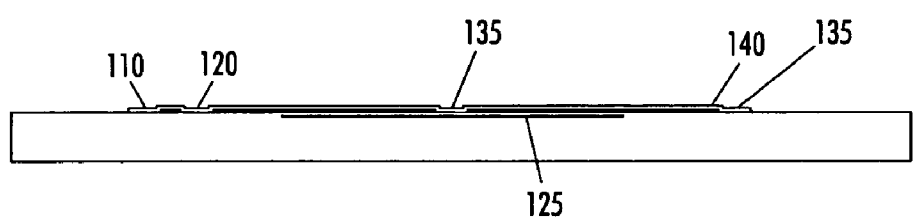

The pulldown electrode 125 will pull down the deformable mirror or reflector membrane 140 when the voltage is applied between it and the deformable mirror or reflector membrane 140. In this example, the deformable mirror or reflector membrane 140 has posts 135 and ridges 120 which become the contact points (as illustrated in FIG. 36) when the deformable mirror or reflector membrane 140 is flattened on the substrate. It is noted that the posts 135 and ridges 120 may also be formed on the substrate.

The space between the posts 135 and the ridges 120 and the deformable mirror or reflector membrane's stress is such that when, as illustrated in FIG. 36, the deformable mirror or reflector membrane 140 is pulled down all posts 135 and ridges 120 are in contact with the substrate and the surface curvature between posts 135 and ridges 120 is negligible.

The posts 135 and ridge 120 are made small and narrow and there are holes 130 in the pulldown electrode 125 surrounding the contact area 135 to minimize electric field in the contact area and to minimize stiction. When the posts 135 and ridge 120 are in the membrane they are also minimized to avoid light scattering.

Figure 38:
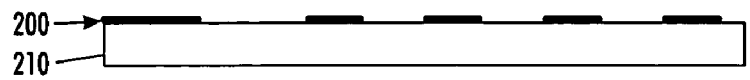
FIGS. 38 through 43 illustrate a fabrication process for the deformable mirror membranes according to the concepts of the present invention.
Figure 39:
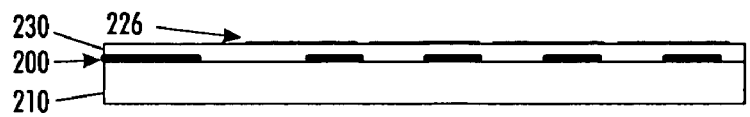
Figure 40:
Figure 41:
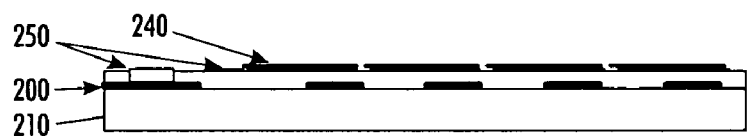
Figure 42:
Figure 43:
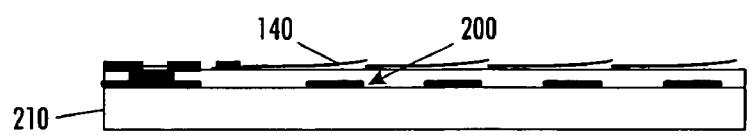

FIGS. 38 through 43 illustrate a fabrication process for the deformable mirror or reflector membranes, according to the concepts of the present invention. As illustrated in FIG. 38, a metal pattern 200 is formed on a substrate 210. Thereafter, as illustrated in FIG. 39, an oxide layer 230 and a release layer 220 are formed. Thereafter, as illustrated in FIG. 40, the deformable mirror or reflector membranes 240 are formed with an oxide layer, aluminum layer, and another oxide layer. As illustrated in FIG. 41, vias 250 are etched. In FIG. 42, a contact metal lift is formed, and in FIG. 43, the deformable mirror or reflector membranes 140 are released.

Figure 44:
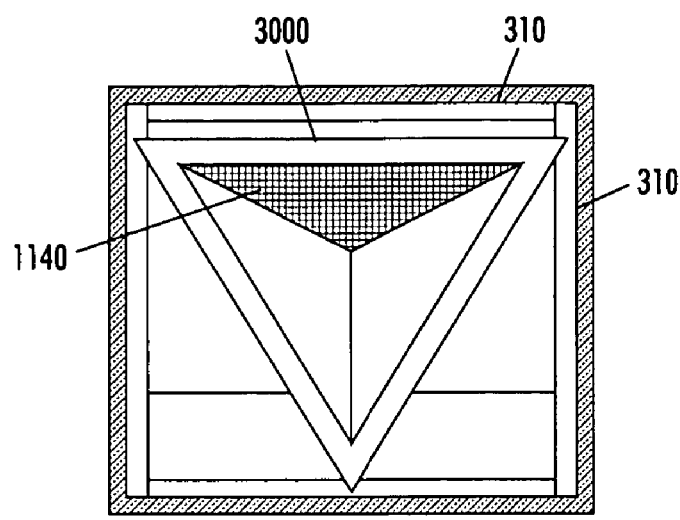
FIGS. 44 and 45 show top views of a modulated retroreflector using deformable mirror devices according to the concepts of the present invention.

As mentioned above, in communications systems, the power required for transmission of the signal, usually through radiated electromagnetic energy, is often the largest part of the energy required by the entire system. For many locations from which communication of data is required, especially when little power is available, a MEMS microshutter corner cube retrorelector can be extremely valuable since it provides the only possible mode for communication. The MEMS microshutter corner cube retroreflector does not radiate energy, rather it is actually a modulated reflector of electromagnetic energy, and is sends the energy directly back to the source of the energy. A MEMS microshutter corner cube retroreflector 3000, as shown in FIG. 44 is composed of an inside corner cube where one of the mirrors is actually an array of deformable mirror or reflector membranes 1140, as described above. The deformable mirror or reflector membranes 1140 can be moved slightly, in unison, which results in a ten to one change in signal returned to the source. Using the deformable mirror or reflector membranes of the present invention, a MEMS microshutter corner cube retroreflector can achieve approximately 100 pJ/bit to 1 nJ/bit at ranges between one hundred meters to and several kilometers assuming a clear line of sight is available when using a laser as the source power. Since the individual deformable mirror or reflector membranes are very small, they can be moved at a rate of between $10^5$ to $10^7$ Hz.

Moreover, using the deformable mirror or reflector membranes of the present invention, a MEMS microshutter corner cube retroreflector requires more than an order of magnitude lower energy per bit than conventionally communication links for mega Hz range of data rate such that the energy is low enough to be used with low energy sensors with the capability to run without batteries by scavenging energy, for example ambient light energy (in FIG. 44, solar cells 310 are used to generate the needed energy), from the local environment.

Figure 45:
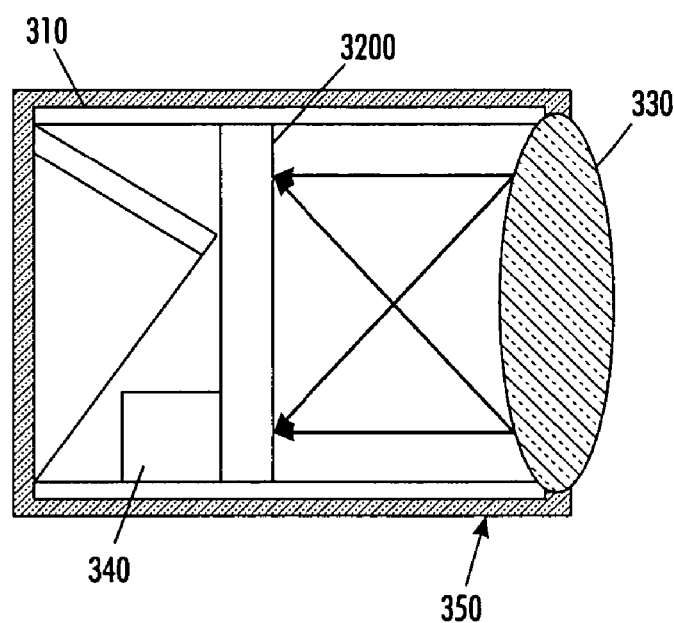

In FIG. 45, an imager 3200 and a lens 330 are shown as a sensor to gather information that can be transmitted by the deformable mirror or reflector membranes 1140 of the MEMS microshutter corner cube retroreflector 3000. An energy storage device 340 is also included to store the energy generated by the solar cells 310.

While various examples and embodiments of the present invention have been shown and described, it will be appreciated by those skilled in the art that the spirit and scope of the present invention are not limited to the specific description and drawings herein, but extend to various modifications and changes.

What is claimed is:

1. A retroreflector, comprising:
a first non-deformable mirror to provide reflection of light back to a source thereof; and
a deformable mirror having a first state to provide reflection of light back to the source thereof and a second state to provide misdirection of light to prevent the reflection of light back to the source thereof;
said deformable mirror including a plurality of MEMS devices, each having a reflective surface thereon, such that when said deformable mirror is in the first state, each reflective surface is in a first position to form a reflective surface that provides reflection of light back to the source thereof;
said plurality of MEMS devices each including,
a substrate,
a flexible membrane attached at least one end to a surface of the substrate and having said reflective surface thereon, said flexible membrane having a movable portion, said flexible membrane being configured such that, in a first state, said movable portion of said flexible membrane is disposed to form a reflective surface that provides reflection of light back to the source thereof; and, in a second state, said movable portion of said flexible membrane is disposed to form a reflective surface that scatters light to prevent the reflection of light back to the source thereof,
an electrode to cause said movable portion of said flexible membrane to flatten so as to be in the first state, and
a plurality of dimples formed on said movable portion of said flexible membrane such that when said movable portion of said flexible membrane is in the first state, the dimples formed on said movable portion of said flexible membrane contact the substrate, said plurality of dimples forming a non co-linear pattern.

2. The retroreflector as claimed in claim 1, wherein when said deformable mirror is in the second state, each reflective surface is in a second position to form a reflective surface that misdirects light to prevent the reflection of light back to the source thereof.

3. The retroreflector as claimed in claim 2, wherein said reflective surfaces of said deformable mirror varying between said first and second positions to modulate the light being reflected back to the source thereof so as to create a serial pattern of light pulses representing encoded information.

4. The retroreflector as claimed in claim 1, further comprising:
a second non-deformable mirror to provide reflection of light back to a source thereof;
said first non-deformable mirror, said second non-deformable mirror, and said deformable mirror forming a modulated corner cube retroreflector.

5. The retroreflector as claimed in claim 1, wherein each flexible membrane has substantially a same flatness of said flat substrate when said flexible membrane comes into contact with said flat substrate across a majority of its surface area in response to a voltage being applied to a pulldown electrode formed in said flat substrate;
said flexible membrane having a two-dimensional curvature when no voltage is applied to an electrode formed in said flat substrate.

6. The retroreflector as claimed in claim 5, wherein said flexible membrane being in contact with said flat substrate when no voltage is applied to said pulldown electrode formed in said flat substrate.

7. The retroreflector as claimed in claim 5, wherein said flexible membrane being in contact with said flat substrate along an edge of said flexible membrane when no voltage is applied to said pulldown electrode formed in said flat substrate.

8. The retroreflector as claimed in claim 5, wherein each flexible membrane is individually addressable such that each flexible membrane has associated therewith an individual pulldown electrode so that each flexible membrane may have a state different from an adjacent flexible membrane.

9. The retroreflector as claimed in claim 5, wherein all the flexible membranes have a common pulldown electrode associated therewith so that all the flexible membranes are electrically ganged together.

10. The retroreflector as claimed in claim 5, wherein said pulldown electrode is located under a center of an associated flexible membrane.

11. The retroreflector as claimed in claim 5, wherein an edge of said flexible membrane, being in contact with said flat substrate, having slits therein to make said flexible membrane more flexible at said edge.

12. The retroreflector as claimed in claim 5, wherein an edge of said flexible membrane, being in contact with said flat substrate, having cutaway sections therein to make said flexible membrane more flexible at said edge.

13. The retroreflector as claimed in claim 5, wherein said pulldown electrode is segmented.

14. The retroreflector as claimed in claim 5, wherein said pulldown electrode is segmented to reduce capacitance and energy.

15. The retroreflector as claimed in claim 1, wherein said plurality of addressable MEMS devices are individually addressable such that when the individually addressable MEMS device is in a first state, the reflective surface thereof is in a first position to form a reflective surface that provides reflection of a portion of the light back to the source thereof.

16. The retroreflector as claimed in claim 15, wherein when the individually addressable MEMS device is in the second state to scatter a portion of the light to prevent the reflection of a portion of the light back to the source thereof.

17. The retroreflector as claimed in claim 16, wherein said individual reflective surfaces of said deformable mirror individually varying between said first and second positions to modulate the light being reflected back to the source thereof so as to create a parallel pattern of light pulses representing encoded information.

18. The retroreflector as claimed in claim 1, wherein said plurality of individually addressable MEMS devices are individually addressable such that when all of the individually addressable MEMS devices are in a first state, the reflective surface thereof is in a first position to form a reflective surface, the reflective surfaces of all the individually addressable MEMS device being in the same plane so as to provide reflection of the light back to the source thereof.

19. The retroreflector as claimed in claim 18, wherein when all of the individually addressable MEMS devices are in the second state, the reflective surface thereof is in a second position so as to scatter the light to prevent the reflection of the light back to the source thereof.

20. The retroreflector as claimed in claim 19, wherein said individual reflective surfaces of said deformable mirror individually varying between said first and second positions to modulate the light being reflected back to the source thereof so as to create a serial pattern of light pulses representing encoded information.

21. The retroreflector as claimed in claim 1, further comprising:
a light absorbing material;
said deformable mirror, when in the second state, misdirecting light to said light absorbing material to prevent the reflection of light back to the source thereof.

22. A retroreflector, comprising:
a first non-deformable mirror to provide reflection of light back to a source thereof; and
a deformable mirror having a first state to provide reflection of light back to the source thereof and a second state to provide misdirection of light to prevent the reflection of light back to the source thereof;
said deformable mirror including a plurality of MEMS devices, each having a reflective surface thereon, such that when said deformable mirror is in the first state, each reflective surface is in a first position to form a reflective surface that provides reflection of light back to the source thereof;
said plurality of MEMS devices each including,
a substrate,
a flexible membrane attached at least one end to a surface of the substrate and having said reflective surface thereon, said flexible membrane having a movable portion, said flexible membrane being configured such that, in a first state, said movable portion of said flexible membrane is disposed to form a reflective surface that provides reflection of light back to the source thereof, and, in a second state, said movable portion of said flexible membrane is disposed to form a reflective surface that scatters light to prevent the reflection of light back to the source thereof,
an electrode to cause said movable portion of said flexible membrane to flatten so as to be in the first state, and
a plurality of posts projections formed on the substrate in a predetermined pattern, said predetermined pattern of posts providing a surface to which said movable portion of said flexible membrane is substantially flattened when said movable portion of said flexible membrane is in the first state, said predetermined pattern of posts formed on the substrate contact said movable portion of said flexible membrane, said predetermined pattern of posts being a non co-linear pattern.

23. The retroreflector as claimed in claim 22, wherein when said deformable mirror is in the second state, each reflective surface is in a second position to form a reflective surface that misdirects light to prevent the reflection of light back to the source thereof.

24. The retroreflector as claimed in claim 23, wherein said reflective surfaces of said deformable mirror varying between said first and second positions to modulate the light being reflected back to the source thereof so as to create a serial pattern of light pulses representing encoded information.

25. The retroreflector as claimed in claim 22, further comprising:
a second non-deformable mirror to provide reflection of light back to a source thereof;
said first non-deformable mirror, said second non-deformable mirror, and said deformable mirror forming a modulated corner cube retroreflector.

26. The retroreflector as claimed in claim 22, wherein each flexible membrane has substantially a same flatness of said flat substrate when said flexible membrane comes into contact with said flat substrate across a majority of its surface area in response to a voltage being applied to a pulldown electrode formed in said flat substrate;
said flexible membrane having a two-dimensional curvature when no voltage is applied to an electrode formed in said flat substrate.

27. The retroreflector as claimed in claim 26, wherein said flexible membrane being in contact with said flat substrate when no voltage is applied to said pulldown electrode formed in said flat substrate.

28. The retroreflector as claimed in claim 26, wherein said flexible membrane being in contact with said flat substrate along an edge of said flexible membrane when no voltage is applied to said pulldown electrode formed in said flat substrate.

29. The retroreflector as claimed in claim 26, wherein each flexible membrane is individually addressable such that each flexible membrane has associated therewith an individual pulldown electrode so that each flexible membrane may have a state different from an adjacent flexible membrane.

30. The retroreflector as claimed in claim 26, wherein all the flexible membranes have a common pulldown electrode associated therewith so that all the flexible membranes are electrically ganged together.

31. The retroreflector as claimed in claim 26, wherein said pulldown electrode is located under a center of an associated flexible membrane.

32. The retroreflector as claimed in claim 26, wherein an edge of said flexible membrane, being in contact with said flat substrate, having slits therein to make said flexible membrane more flexible at said edge.

33. The retroreflector as claimed in claim 26, wherein an edge of said flexible membrane, being in contact with said flat substrate, having cutaway sections therein to make said flexible membrane more flexible at said edge.

34. The retroreflector as claimed in claim 26, wherein said pulldown electrode is segmented.

35. The retroreflector as claimed in claim 26, wherein said pulldown electrode is segmented to reduce capacitance and energy.

36. The retroreflector as claimed in claim 22, wherein said plurality of addressable MEMS devices are individually addressable such that when the individually addressable MEMS device is in a first state, the reflective surface thereof is in a first position to form a reflective surface that provides reflection of a portion of the light back to the source thereof.

37. The retroreflector as claimed in claim 36, wherein when the individually addressable MEMS device is in the second state to scatter a portion of the light to prevent the reflection of a portion of the light back to the source thereof.

38. The retroreflector as claimed in claim 37, wherein said individual reflective surfaces of said deformable mirror individually varying between said first and second positions to modulate the light being reflected back to the source thereof so as to create a parallel pattern of light pulses representing encoded information.

39. The retroreflector as claimed in claim 22, wherein said plurality of individually addressable MEMS devices are individually addressable such that when all of the individually addressable MEMS devices are in a first state, the reflective surface thereof is in a first position to form a reflective surface, the reflective surfaces of all the individually addressable MEMS device being in the same plane so as to provide reflection of the light back to the source thereof.

40. The retroreflector as claimed in claim 39, wherein when all of the individually addressable MEMS devices are in the second state, the reflective surface thereof is in a second position so as to scatter the light to prevent the reflection of the light back to the source thereof.

41. The retroreflector as claimed in claim 40, wherein said individual reflective surfaces of said deformable mirror individually varying between said first and second positions to modulate the light being reflected back to the source thereof so as to create a serial pattern of light pulses representing encoded information.

42. The retroreflector as claimed in claim 22, further comprising:
a light absorbing material;
said deformable mirror, when in the second state, misdirecting light to said light absorbing material to prevent the reflection of light back to the source thereof.

43. A passive interrogatable sensor for being interrogated by an interrogation source using interrogation light, comprising:
a sensing device to sense a predetermined condition of a surrounding environment and generate signals representative of the sensed predetermined condition, the predetermined condition being independent of the interrogation light;
a controller to process the generated signals and to produce drive signals in response thereof;
a first non-deformable mirror to provide reflection of the interrogation light; and
a deformable mirror, operatively connected to said controller, being driven to either a first state or a second state in response to drive signals from said controller, said first state providing reflection of the interrogation light, said second state providing misdirection of light to prevent the reflection of the interrogation light.

44. The passive interrogatable sensor as claimed in claim 43, wherein said deformable mirror comprises a plurality of MEMS devices, each having a reflective surface thereon, such that when said deformable mirror is driven to said first state, each reflective surface is in a first position to form a reflective surface that provides reflection of the interrogation light.

45. The passive interrogatable sensor as claimed in claim 44, wherein when said deformable mirror is driven to said second state, each reflective surface is in a second position to misdirect light to prevent the reflection of the interrogation light.

46. The passive interrogatable sensor as claimed in claim 45, wherein said reflective surfaces of said deformable mirror varying between said first and second positions to modulate the interrogation light being reflected so as to create a serial pattern of light pulses representing encoded information.

47. The passive interrogatable sensor as claimed in claim 44, wherein each MEMS device comprises:
a substrate;
a flexible membrane attached at least one end to a surface of the substrate and having said reflective surface thereon, the flexible membrane being configured such that, in a first state, said flexible membrane is disposed to form a reflective surface that provides reflection of the interrogation light, and, in a second state, said flexible membrane is disposed to form a reflective surface that scatters light to prevent the reflection of the interrogation light; and
a plurality of dimples formed on the flexible membrane such that when the flexible membrane is in the first state, the flexible membrane contacts the substrate at the dimples.

48. The passive interrogatable sensor as claimed in claim 44, wherein each MEMS device comprises:
a substrate;
a flexible membrane attached at least one end to a surface of the substrate and having said reflective surface thereon, the flexible membrane being configured such that, in a first state, said flexible membrane is disposed to form a reflective surface that provides reflection of the interrogation light, and, in a second state, said flexible membrane is disposed to form a reflective surface that scatters light to prevent the reflection of the interrogation light; and
a plurality of posts formed on the substrate such that when the flexible membrane is in the first state, the posts formed on the substrate contact the flexible membrane.

49. The passive interrogatable sensor as claimed in claim 43, further comprising:
a second non-deformable mirror to provide reflection of the interrogation light being reflected;
said first non-deformable mirror, said second non-deformable mirror, and said deformable mirror forming a modulated corner cube retroreflector.

50. The passive interrogatable sensor as claimed in claim 43, wherein said deformable mirror comprises a plurality of MEMS devices, each having an electrode membrane having a reflective surface thereon;

said electrode membrane having substantially a same flatness of said flat substrate when said electrode membrane comes into contact with said flat substrate across a majority of its surface area in response to a voltage being applied to a pulldown electrode formed in said flat substrate;

said electrode membrane having a two-dimensional curvature when no voltage is applied to an electrode formed in said flat substrate.

51. The passive interrogatable sensor as claimed in claim 50, wherein said electrode membrane being in contact with said flat substrate at two points when no voltage is applied to said pulldown electrode formed in said flat substrate.

52. The passive interrogatable sensor as claimed in claim 50, wherein said electrode membrane being in contact with said flat substrate along an edge of said electrode membrane when no voltage is applied to said pulldown electrode formed in said flat substrate.

53. The passive interrogatable sensor as claimed in claim 50, wherein each electrode membrane is individually addressable such that each electrode membrane has associated therewith an individual pulldown electrode so that each electrode membrane may have a state different from an adjacent electrode membrane.

54. The passive interrogatable sensor as claimed in claim 50, wherein all the electrode membranes have a common pulldown electrode associated therewith so that all the electrode membranes are electrically ganged together.

55. The passive interrogatable sensor as claimed in claim 50, wherein said pulldown electrode is located under a center of an associated electrode membrane.

56. The passive interrogatable sensor as claimed in claim 50, wherein an edge of said electrode membrane, being in contact with said flat substrate, having slits therein to make said electrode membrane more flexible at said edge.

57. The passive interrogatable sensor as claimed in claim 50, wherein an edge of said electrode membrane, being in contact with said flat substrate, having cutaway sections therein to make said electrode membrane more flexible at said edge.

58. The passive interrogatable sensor as claimed in claim 50, wherein said pulldown electrode is segmented.

59. The passive interrogatable sensor as claimed in claim 50, wherein said pulldown electrode is segmented so that a greater electrostatic force is realized at a center of an associated electrode membrane.

60. The passive interrogatable sensor as claimed in claim 43, wherein said deformable mirror comprises a plurality of individually addressable MEMS devices, each having a reflective surface thereon, such that when the individually addressable MEMS device is in a first state, the reflective surface thereof is in a first position to form a reflective surface that provides reflection of a portion of the interrogation light.

61. The passive interrogatable sensor as claimed in claim 60, wherein when the individually addressable MEMS device is in the second state, the reflective surface thereof is in a second position to scatter a portion of the light to prevent the reflection of a portion of the interrogation light.

62. The passive interrogatable sensor as claimed in claim 61, wherein said individual reflective surfaces of said deformable mirror individually varying between said first and second positions to modulate the interrogation light being reflected so as to create a parallel pattern of light pulses representing encoded information.

63. The passive interrogatable sensor as claimed in claim 43, wherein said deformable mirror comprises a plurality of individually addressable MEMS devices, each having a reflective surface thereon, such that when all of the individually addressable MEMS devices are in a first state, the reflective surface thereof is in a first position to form a reflective surface, the reflective surfaces of all the individually addressable MEMS device being in the same plane so as to provide reflection of the interrogation light.

64. The passive interrogatable sensor as claimed in claim 63, wherein when all of the individually addressable MEMS devices are in the second state, the reflective surface thereof is in a second position so as to scatter the light to prevent the reflection of the interrogation light.

65. The passive interrogatable sensor as claimed in claim 64, wherein said individual reflective surfaces of said deformable mirror individually varying between said first and second positions to modulate the interrogation light being reflected so as to create a serial pattern of light pulses representing encoded information.

66. The passive interrogatable sensor as claimed in claim 43, further comprising:
a light absorbing material;
said deformable mirror, when in the second state, misdirecting light to said light absorbing material to prevent the reflection of the interrogation light.

67. An optical identification system, comprising:
a laser source, disposed remotely from an object to be interrogated, for transmitting an unmodulated beam toward the object to be interrogated;
a controller, disposed with the object to be interrogated, to produce drive signals associated with identification information;
a first non-deformable mirror, disposed with the object to be interrogated, to provide reflection of light back to said laser source;
a deformable mirror, disposed with the object to be interrogated and operatively connected to said controller, being driven to either a first state or a second state in response to drive signals from said controller, said first state providing reflection of light back to said laser source, said second state providing misdirection of light to prevent the reflection of light back to said laser source;
said deformable mirror modulating the light to be reflected back to the laser source so as to encode identification information as reflected modulated light; and
a detector, disposed with said laser source, to decode identification information from light received from said deformable mirror disposed with the object to be interrogated.

68. The optical identification system as claimed in claim 67, wherein said deformable mirror comprises a plurality of MEMS devices, each having a reflective surface thereon, such that when said deformable mirror is driven to the first state, each reflective surface is in a first position to form a reflective surface that provides reflection of light back to said laser source.

69. The optical identification system as claimed in claim 68, wherein when said deformable mirror is driven to the second state, each reflective surface is in a second position to misdirect light to prevent the reflection of light back to said laser source.

70. The optical identification system as claimed in claim 69, wherein said reflective surfaces of said deformable mirror varying between said first and second positions to modulate the light being reflected back to said laser source so as to create a serial pattern of light pulses representing encoded identification information.

71. The optical identification system as claimed in claim 69, wherein said deformable mirror comprises a plurality of MEMS devices, each having an electrode membrane having a reflective surface thereon;

said electrode membrane having substantially a same flatness of said flat substrate when said electrode membrane comes into contact with said flat substrate across a majority of its surface area in response to a voltage being applied to a pulldown electrode formed in said flat substrate;

said electrode membrane having a two-dimensional curvature when no voltage is applied to an electrode formed in said flat substrate.

72. The optical identification system as claimed in claim 71, wherein said electrode membrane being in contact with said flat substrate at two points when no voltage is applied to said pulldown electrode formed in said flat substrate.

73. The optical identification system as claimed in claim 71, wherein said electrode membrane being in contact with said flat substrate along an edge of said electrode membrane when no voltage is applied to said pulldown electrode formed in said flat substrate.

74. The optical identification system as claimed in claim 71, wherein each electrode membrane is individually addressable such that each electrode membrane has associated therewith an individual pulldown electrode so that each electrode membrane may have a state different from an adjacent electrode membrane.

75. The optical identification system as claimed in claim 71, wherein all the electrode membranes have a common pulldown electrode associated therewith so that all the electrode membranes are electrically ganged together.

76. The optical identification system as claimed in claim 71, wherein said pulldown electrode is located under a center of an associated electrode membrane.

77. The optical identification system as claimed in claim 71, wherein an edge of said electrode membrane, being in contact with said flat substrate, having slits therein to make said electrode membrane more flexible at said edge.

78. The optical identification system as claimed in claim 71, wherein an edge of said electrode membrane, being in contact with said flat substrate, having cutaway sections therein to make said electrode membrane more flexible at said edge.

79. The optical identification system as claimed in claim 71, wherein said pulldown electrode is segmented.

80. The optical identification system as claimed in claim 71, wherein said pulldown electrode is segmented so that a greater electrostatic force is realized at a center of an associated electrode membrane.

81. The optical identification system as claimed in claim 68, wherein each MEMS device comprises:

a substrate;

a flexible membrane attached at least one end to a surface of the substrate and having said reflective surface thereon, the flexible membrane being configured such that, in a first state, said flexible membrane is disposed to form a reflective surface that provides reflection of light back to said laser source, and, in a second state, said flexible membrane is disposed to form a reflective surface that scatters light to prevent the reflection of light back to said laser source; and a plurality of dimples formed on the flexible membrane such that when the flexible membrane is in the first state, the flexible membrane contacts the substrate at the dimples.

82. The optical identification system as claimed in claim 68, wherein each MEMS device comprises:

a substrate;

a flexible membrane attached at least one end to a surface of the substrate and having said reflective surface thereon, the flexible membrane being configured such that, in a first state, said flexible membrane is disposed to form a reflective surface that provides reflection of light back to said laser source, and, in a second state, said flexible membrane is disposed to form a reflective surface that scatters light to prevent the reflection of light back to said laser source; and a plurality of posts formed on the substrate such that when the flexible membrane is in the first state, the posts formed on the substrate contact the flexible membrane.

83. The optical identification system as claimed in claim 67, further comprising:

a second non-deformable mirror to provide reflection of light back to said laser source;

said first non-deformable mirror, said second non-deformable mirror, and said deformable mirror forming a modulated corner cube retroreflector.

84. The optical identification system as claimed in claim 67, wherein said deformable mirror comprises a plurality of individually addressable MEMS devices, each having a reflective surface thereon, such that when the individually addressable MEMS device is in a first state, the reflective surface thereof is in a first position to form a reflective surface that provides reflection of a portion of the light back to said laser source.

85. The optical identification system as claimed in claim 84, wherein when the individually addressable MEMS device is in the second state, the reflective surface thereof is in a second position to scatter a portion of the light to prevent the reflection of a portion of the light back to said laser source.

86. The optical identification system as claimed in claim 85, wherein said individual reflective surfaces of said deformable mirror individually varying between said first and second positions to modulate the light being reflected back to said laser source so as to create a parallel pattern of light pulses representing encoded identification information.

87. The optical identification system as claimed in claim 67, wherein said deformable mirror comprises a plurality of individually addressable MEMS devices, each having a reflective surface thereon, such that when all of the individually addressable MEMS devices are in a first state, the reflective surface thereof is in a first position to form a reflective surface, the reflective surfaces of all the individually addressable MEMS device being in the same plane so as to provide reflection of the light back to the source thereof.

88. The optical identification system as claimed in claim 87, wherein when all of the individually addressable MEMS devices are in the second state, the reflective surface thereof is in a second position so as to scatter the light to prevent the reflection of the light back to the source thereof.

89. The optical identification system as claimed in claim 88, wherein said individual reflective surfaces of said deformable mirror individually varying between said first and second positions to modulate the light being reflected back to the source thereof so as to create a serial pattern of light pulses representing encoded information.

90. The optical identification system as claimed in claim 67, further comprising:

a light absorbing material;

said deformable mirror, when in the second state, misdirecting light to said light absorbing material to prevent the reflection of light back to said laser source.

* * * * *